US005788944A

United States Patent [19]

Kikkawa et al.

[11] Patent Number: 5,788,944

[45] Date of Patent: Aug. 4, 1998

[54] WET-TYPE FLUE GAS DESULFURIZATION PLANT AND METHOD MAKING USE OF A SOLID DESULFURIZING AGENT

[75] Inventors: Hirofumi Kikkawa; Fumito Nakajima; Hiroyuki Kaku; Shigehito Takamoto; Hiroshi Ishizaka; Shigeru Nozawa; Masakatsu Nishimura, all of Kure; Takanori Nakamoto, Tokyo, all of Japan

[73] Assignee: Babcock-Hitachi Kabushiki Kaisha, Japan

[21] Appl. No.: 532,758

[22] PCT Filed: May 11, 1995

[86] PCT No.: PCT/JP95/00922

§ 371 Date: Oct. 11, 1995

§ 102(e) Date: Oct. 11, 1995

[87] PCT Pub. No.: WO96/26785

PCT Pub. Date: Jun. 9, 1996

[30] Foreign Application Priority Data

Feb. 28, 1995 [JP] Japan .................................... 7-040317

[51] Int. Cl.[6] ............................ B01D 53/50; B01D 53/78

[52] U.S. Cl. .................... 423/243.01; 422/140; 422/168; 422/171; 422/110; 422/215; 422/225; 422/234; 423/243.05; 423/243.08

[58] Field of Search ..................................... 422/168–169, 422/110, 170, 111, 171, 139–140, 145, 213, 215, 225, 231, 234; 423/243.08, 243.01, DIG. 5, 243.05

[56] References Cited

U.S. PATENT DOCUMENTS

| | | | |
|---|---|---|---|
| 4,490,341 | 12/1984 | Cares | 423/243.08 |
| 4,696,804 | 9/1987 | Shinoda et al. | 423/243.08 |
| 5,686,053 | 11/1997 | Kikkawa et al. | 423/243.01 |

FOREIGN PATENT DOCUMENTS

| | | | |
|---|---|---|---|
| 62-298427 | 12/1987 | Japan . | |
| 63-298428 | 12/1987 | Japan . | |
| 5-33828 | 5/1993 | Japan . | |
| 5-228336 | 9/1993 | Japan | 423/243.08 |

*Primary Examiner*—Hien Tran

*Attorney, Agent, or Firm*—Lorusso & Loud

[57] ABSTRACT

Exhaust gas from combustion equipment such as a boiler is brought into contact with an absorbing liquid to absorb sulfur oxide from the exhaust gas into the absorbing liquid. Limestone particles having larger diameters are selectively retained in a zone wherein the absorbing liquid that has absorbed the sulfur oxide from the exhaust gas is neutralized. The absorbing liquid containing water and the gypsum thereby formed, as main constituents, are selectively drained from the neutralizing zone and recycled for renewed contact with the exhaust gas. Because of the possibility of a large decrease of desulfurizing performance due to a variation in the load on the boiler, etc., at least one of the following is monitored: pressure drop across the neutralizing zone, torque of a stirring device, solids concentration in the absorbing liquid, specific gravity of the absorbing liquid and viscosity of the absorbing liquid. Responsive to the monitored parameters outlet $SO_2$ concentration is controlled within a predetermined range by regulation of at least one of the following: flow rate of the absorbing liquid circulated into contact with the exhaust gas, amount of the solid desulfurizing agent added to the absorbing liquid, particle diameter of the solid desulfurizing agent and speed of agitation of the solid desulfurizing agent in the neutralizing zone.

22 Claims, 24 Drawing Sheets

WET-TYPE FLUE GAS DESULFURIZATION PLANT AND METHOD MAKING USE OF A SOLID DESULFURIZING AGENT

CROSS-REFERENCE TO RELATED APPLICATION

The present application is related to commonly owned U.S. application No. 08/532.759 filed Oct. 11. 1995 of the same title.

BACKGROUND OF THE INVENTION

1. Field of the Invention:

This invention relates to a wet-type flue gas desulfurization plant and method, and more particularly, to a wet-type flue gas desulfurization plant and method making use of a solid desulfurizing agent for economically removing sulfur oxides in flue gas exhausted from combustion equipment, such as boilers, with higher desufurization performance, for reducing abrasion of the pump for circulating the absorbing liquid and the nozzle for atomizing the same, for ameliorating the affect on desulfurization performance due to aluminum and fluorine components in the absorbing liquid, and for reducing power required for grinding solid desulfurizing agents such as limestone, with excellent controllability over a range of amount of exhaust gas and $SO_2$ concentration therein.

2. Description of the Related Art:

Sulfur oxides in flue gas generated as a result of combustion of fossil fuel in thermal power plants, etc., particularly sulfur dioxide (hereinafter referred to simply as $SO_2$), is a main cause of global environmental problems such as air pollution, acid rain and the like. Thus, studies on flue gas desulfurization methods to remove $SO_2$ therefrom and development of flue gas desulfurization plants have become important.

Although various processes have been proposed for flue gas desulfurization, the wet-type is the major process. The wet-type processes include methods using sodium, calcium and magnesium compounds as an absorbent, respectively. The sodium method, above all, is excellent in reactivity between the absorbent and $SO_2$, but the sodium compounds used are very expensive. For this reason the calcium method using relatively cheaper calcium compounds such as calcium carbonate is most widely employed as a flue gas desulfurization system for large boilers in power plants.

The desulfurization methods using such calcium compounds in the absorbing liquid are generally classified into spraying, wetted wall and bubbling systems, depending on the particular gas-liquid contacting method. While each system independently has outstanding characteristic features, the spraying system is considerably popular and reliable, and is thus the most widely used worldwide. The conventional spraying desulfurization system once comprised three towers, i.e., a cooling tower for cooling and dust-removal treatment of the exhaust gas, a desulfurization tower for spraying absorbing liquid into the exhausted gas for reaction with $SO_2$ and an oxidation tower for oxidizing calcium sulfite formed in the desulfurization tower. Recently, a mono-tower desulfurization system (an in-tank oxidizing method) in which the desulfurization tower provides both cooling and oxidation functions has been developed and is now becoming the most popular spraying system.

FIG. 27 shows an example of a conventional spraying mono-tower desulfurization plant. In general, such a mono-tower desulfurization system comprises a tower body 1, an inlet duct 2, an outlet duct 3, a spray nozzle 4, absorbing liquid pumps 5, a circulation tank 6, a stirring device 7, an air blower 8, a mist eliminator 9, absorbing liquid draining pipes 10, a gypsum draining pipe 11, a limestone supplying pipe 12, a hydroextractor 13, pH meters 21 and the like. Several arrays of spray nozzles 4 are arranged horizontally and several stages thereof are arranged vertically. The stirring device 7 and the air blower 8 are connected to the circulation tank 6 located in a lower portion of the desulfurization tower where the absorbing liquid collects, while the mist eliminator 9 is arranged at an upper portion of the desulfurization tower or in the outlet duct 3.

Exhaust gas A exhausted from a boiler is introduced to the desulfurization tower body 1 from the inlet duct 2 and exhausted through the outlet duct 3. At the same time, the absorbing liquid is pumped to the desulfurization tower by the absorbing liquid pumps 5 through the absorbing liquid draining pipes 10 and is sprayed therein from a plurality of nozzles 4 for gas-liquid contact between the absorbing liquid and the exhaust gas A. Upon spraying, S02 is selectively absorbed by the absorbing liquid from the exhaust gas A to form calcium sulfite. The absorbing liquid containing the thus formed calcium sulfite collects in the circulation tank 6 where, with agitation by means of the stirring device 7, calcium sulfite in the absorbing liquids is oxidized by air B supplied by the air blower 8 to form gypsum C. A desulfurizing agent such as limestone D is added to the absorbing liquid in the circulation tank 6 through the limestone supplying pipe 12. A portion of the absorbing liquid in the circulation tank 6 where limestone D and gypsum C coexist is once again pumped by the absorbing liquid pumps 5 to the spray nozzles 4 through the absorbing liquid draining pipes 10, while an another portion thereof is pumped to the dehydrator or hydroextractor 13 through the gypsum draining pipe 11 to collect gypsum C after dehydration. Smaller droplets of the absorbing liquid sprayed out of and atomized by the spray nozzle 4 are entrained with the exhaust gas A and collected by the mist eliminator 9 located in an upper part of the desulfurization tower.

The prior art as illustrated in FIG. 27, however, has the following problems.

(1) The absorbing liquid contains not only calcium carbonate (limestone) which absorbs $So_2$ but also a considerable amount of gypsum which makes no contribution to the absorption. When the proportion of the limestone in the absorbing liquid is increased so as to improve the desulfurization performance, then the quality of gypsum is decreased to a useless level.

(2) Considerable energy is consumed in grinding the limestone.

(3) When aluminum and fluorine components coexist in the absorbing liquid, inactive compounds containing aluminum and fluorine are formed on the surfaces of the limestone particles, which decreases the desulfurization performance.

Accordingly, it is an object of the present invention to provide an flue gas desulfurization plant and method which solve the conventional problems as described above and which economically achieve higher desulfurization performance.

Another object of the present invention is to provide a flue gas desulfurization plant and method capable of increasing desulfurization performance without decreasing the quality of the gypsum formed in the process.

Still another object of the present invention is to provide a flue gas desulfurization plant and method with higher desulfurization performance capable of reducing cost of power for grinding limestone.

A further object of the present invention is to provide a flue gas desulfurization plant and method with higher desulfurization performance, capable of easily separating limestone contained in absorbing liquid from the gypsum formed therefrom.

A still further object of the present invention is to provide a flue gas desulfurization plant and method capable of maintaining high desulfurization performance irrespective of variation in load on the combustion equipment such as a boiler etc. or in concentration of sulfur oxides in the flue gas.

The other objects of the present invention will become apparent from a reading of the following examples.

SUMMARY OF THE INVENTION

The present invention provides a wet-type flue gas desulfurization method making use of a solid desulfurizing agent wherein exhaust gas exhausted from a combustion device such as a boiler is contacted with absorbing liquid, and wherein the solid desulfurizing agent is selectively left in a neutralizing zone for neutralizing the absorbing liquid containing the sulfur oxide thus absorbed from the exhaust gas. The reaction product produced by reaction of the sulfur oxide with the desulfurizing agent and the absorbing liquid containing water as a main constituent are selectively drained, and the absorbing liquid thus drained from the neutralizing zone is recycled for renewed contact with the exhaust gas to absorb sulfur oxide. At least one of the following parameters is monitored: load on the boiler, sulfur content of the fuel burned in the boiler, flow rate of the exhaust gas, inlet $SO_2$ concentration at the desulfurization plant, outlet $SO_2$ concentration at the desulfurization plant, pH value of the absorbing liquid in the neutralizing zone, pressure loss across the neutralizing zone, torque of a stirring device, solids concentration in the absorbing liquid, specific gravity of the absorbing liquid and viscosity of the absorbing liquid. Responsive to the monitored parameters, at least one of the following process variables is regulated: flow rate of the absorbing liquid contacting the exhaust gas, amount of the solid desulfurizing agent added to the bed, particle diameter of the solid desulfurizing agent and stirring velocity in the neutralizing zone, thereby controlling the outlet $SO_2$ concentration of the desulfurization plant to fall in a predetermined range.

The present invention also provides a wet-type flue gas desulfurization plant making use of a solid desulfurizing agent and includes a neutralizing zone in which exhaust gas exhausted from a combustion apparatus such as a boiler is contacted with absorbing liquid, in which the solid desulfurizing agent is selectively retained, and from which the reaction product produced from sulfur oxide and the absorbing liquid containing water as a main constituent are selectively drained. The desulfurization plant further includes a circulation passage for contacting the absorbing liquid drained from the neutralizing zone with the exhaust gas, regulating means, controlling means and detecting means. The detecting means monitor at least one process parameter selected from load on the boiler, sulfur content in the fuel burned in the boiler, flow rate of the exhaust gas, inlet $SO_2$ concentration at the desulfurization plant, outlet $SO_2$ concentration at the desulfurization plant, pH value of the absorbing liquid in the neutralizing zone, pressure loss across the neutralizing zone, torque of a stirring device, solids concentration in the absorbing liquid, specific gravity of the absorbing liquid and viscosity of the absorbing liquid. The regulating means regulates at least one of: flow rate of the absorbing liquid circulated into contact with the exhaust gas, amount of the solid desulfurizing agent added to the bed, particle diameter of the solid desulfurizing agent and stirring velocity in the neutralizing zone, responsive to parameters detected by the detecting means. The controlling means controls the outlet $SO_2$ concentration of the desulfurization plant to fall within a predetermined range in accordance with operation of the regulating means.

A stirring device is provided for agitating the solid desulfurizing agent in the neutralizing zone and may be a stirring device provided with stirring blades or rakes within the neutralizing zone or equipment to rotate the neutralizing zone itself.

The solid desulfurizing agent used in the present invention preferably has a weight-average particle diameter (hereinafter referred to simply as average particle diameter) of more than 0.5 mm. An average particle diameter of less than 0.5 mm would make it difficult to separate the desulfurizing agent from oxidization reaction products such as gypsum and result in a particle size reduction of the solid desulfurizing agent such as limestone during conveying to the flue gas desulfurization plant. More preferably, the solid desulfurizing agent has an average particle diameter of more than 1.0 mm. The solid desulfurizing agent having an average particle diameter of more than 10 mm would have lower reactivity in neutralization of the absorbing liquid containing $SO_2$ absorbed from the exhaust gas and, in addition, would wear the solid desulfurizing agent supplying pipe which is connected to the neutralizing zone. Accordingly, the solid desulfurizing agent used in the present invention desirably has an average particle diameter of 0.5 mm to 10 mm. However, the solid desulfurizing agent may contain particles less than 0.5 mm because the desirable average particle diameter set forth above is not a strict standard.

It is desirable in the present invention to supply the solid desulfurizing agent by an air-conveying method, in the form of a slurry or in a dried condition to the neutralizing zone.

The amount of the solid desulfurizing agent supplied to the neutralizing zone is controlled by a fixed quantity feeder or on-off operation of a grinder for the solid desulfurizing agent, while particle size of the solid desulfurizing agent is controlled by changing speed of the grinder, etc.

The limestone is a typical example of the solid desulfurizing agent used in the present invention. "Limestone", as the term is used herein, means a sedimentary rock containing calcium carbonate as a main component and further includes magnesium carbonate. Accordingly, dolomite which contains $CaCO_3$ and $MgCO_3$ as main components is included within the meaning of "limestone." Because the limestone contains impurities which affect desulfurising performance, it is desirable that $CaCO_3$ having higher reactivity is exposed on the solid surface by grinding off such impurities. Further, because solid desulfurizing agent of finer particle size is easily included in the solid reaction product such as gypsum, such finer particles should be separated and removed prior to use even though they have higher reactivity. On the other hand, excessively larger particles would damage the solid desulfurizing agent supply system and, therefore it is desirable that the supply system be provided with a filter or a cyclone to classify the solid desulfurizing agent.

According to the present invention, $SO_2$ in the exhaust gas is absorbed by the absorbing liquid (main component: water) to form $H_2SO_3$, and the absorbing liquid which has absorbed the $SO_2$ is oxidized by air to form $H_2SO_4$ (dilute sulfuric acid). The $H_2SO_4$ is neutralized by reaction with the solid desulfurizing agent (limestone in this case, represented by $CaCO_3$ in the reaction formula) to form a solid reaction product (in this case $CaSO_4 2H_2O$: gypsum). The most distinguishing feature of the present invention is the use of limestone as a desulfurizing agent, the limestone having a particle diameter larger than that of the gypsum generated when the absorbing liquid of high pH containing $H_2SO_4$ is neutralized.

Principal reactions occurring in the flue gas desulfurization plant according to the present invention are described hereinafter. The following reaction formulas (1) to (3) are shown as typical reactions for better understanding of the present invention and all reactions occurring in the present flue gas desulfurization plant may not always conform to the formulas (1) to (3).

| | | |
|---|---|---|
| (Absorbing Reaction) | $H_2O + SO_2 = H_2SO_3$ | (1) |
| (Oxidation Reaction) | $H_2SO_3 + ½ O_2 = H_2SO_4$ | (2) |
| (Neutralization Reaction) | $H_2SO_4 + CaCO_3 + H_2O = CaSO_4.2H_2O + CO_2$ | (3) |

The absorbing liquid containing $H_2SO_4$ (dilute sulfuric acid) flows through a neutralization zone wherein the absorbing liquid is neutralized with limestone in accordance with the above neutralization reactions so that the pH of the absorbing liquid is increased. Limestone is again supplied to the neutralization zone as necessary to replace the amount of limestone consumed by the reaction. However, if the pH value after neutralization is determined to control the amount of limestone to be added, is because measurement of pH in the neutralizing zone is impracticable, the amount limestone in the neutralization zone may increase to impede flow of the absorbing liquid, especially when particle diameter of the limestone changes, thereby causing difficulty in controlling the amount of limestone to be added.

On the other hand, it is possible to correctly determine the amount of limestone by measuring not only the pH in the absorbing liquid but also the pressure loss across the limestone layer, torque of the stirring device, solids concentration in the absorbing liquid, specific gravity of the absorbing liquid, viscosity of the absorbing liquid, etc. Increase in pressure drop across of the limestone fluidized layer is proportional to the increase of the amount of limestone and is also affected by the specific gravity of the absorbing liquid, even if the amount of limestone is not varied. Moreover, there is a correlation between the specific gravity of the absorbing liquid and the viscosity of the absorbing liquid or the solids concentration (substantially gypsum particles) therein. Generally, the pressure drop $\Delta P$) across the fluidized layer is expressed by the following formula.

$\Delta P$=(specific gravity of limestone−specific gravity of absorbing liquid)×(height of limestone layer)×(1−void ratio)

The void ratio in the above formula is a value for a fluidized condition; however, the product of (height of limestone layer)×(1−void ratio) is the same under both stationary and fluidized conditions, so that the height of the stationary limestone layer can be determined by the formula above. Given that the specific gravity of limestone is known (about 2.7) and the void ratio thereof under a stationary condition is about 0.4, although dependent on particle shape, the height of the limestone layer is obtainable from determination of pressure drop $\Delta P$ and specific gravity of the absorbing liquid. Further, as specific gravity of the absorbing liquid correlates with particle concentration (substantially gypsum particle concentration in this case) or viscosity of the absorbing liquid, such concentration or viscosity may be determined instead of the specific gravity.

FIG. 5 shows the correlation between the height of the limestone layer and pressure drop, which are proportional to each other if the solids concentration of the absorbing liquid is constant. In this way, the height of limestone layer can be estimated by previously obtaining the correlation between the height of limestone and the pressure drop when the solids condensation (specific gravity) of the absorbing liquid is varied, so as to easily control the concentration of $SO_2$ at the outlet to correspond to the amount of exhaust gas or variation of $SO_2$ concentration in the exhaust gas, by regulating the supply amount and/or particle size of the limestone.

DESCRIPTION OF THE PREFERRED EMBODIMENTS

The present invention will be described hereinafter in detail by way of various embodiments but is not intended to be limited to these embodiments.

First Example (Embodiment)

Figure 1:
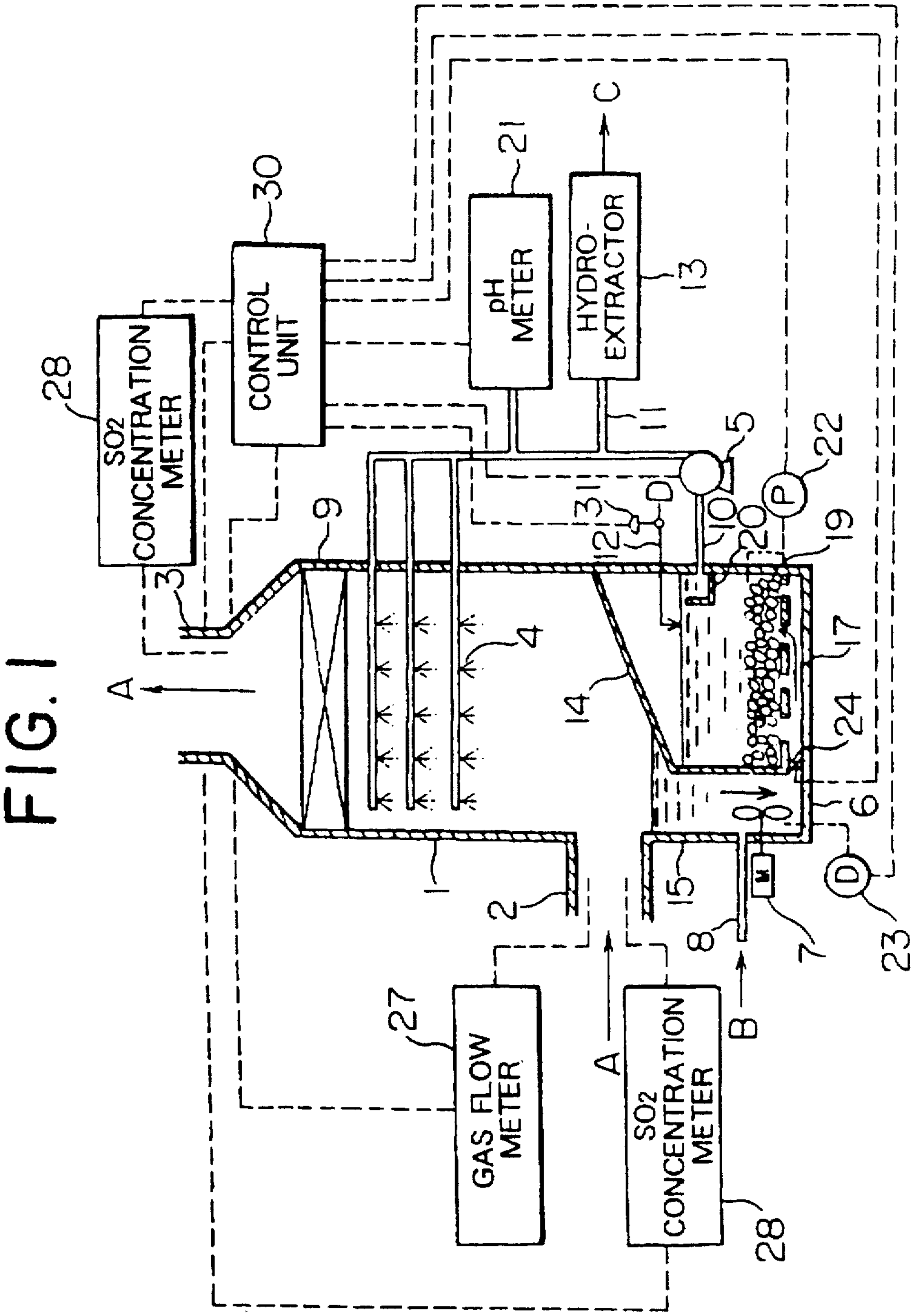
FIG. 1 is a schematic view of a mono-tower wet-type flue gas desulfurization plant according to a first example of the present invention.
Figure 2:
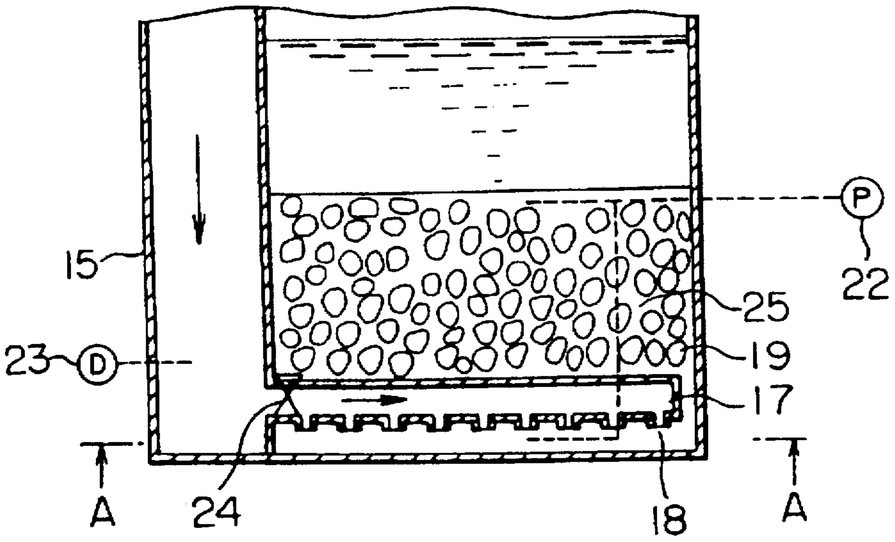
FIG. 2 is an enlarged view of the neutralizing zone in FIG. 1.
Figure 3:
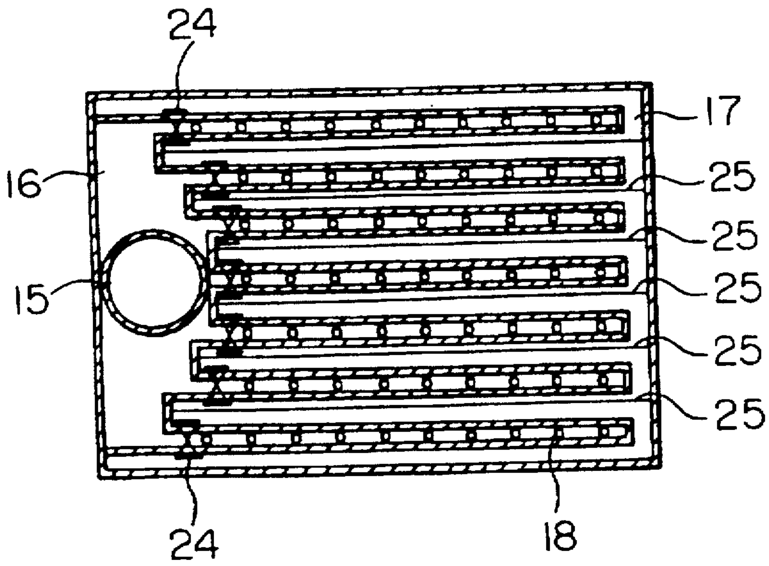
FIG. 3 is a sectional view of the neutralizing zone taken along a line A—A in FIG. 2.

A mono-tower wet-type flue gas desulfurization plant according to a first embodiment of the present invention is shown in FIGS. 1 to 3. The mono-tower wet-type flue gas desulfurization plant includes a desulfurization tower body 1, an inlet duct 2, an outlet duct 3, a spray nozzle 4, absorbing liquid pumps 5, a circulation tank 6, a stirring device 7, an air blower 8, a mist eliminator 9, a limestone supply pipe 12, an open-close valve 31 for the supply pipe 12 and the like. The desulfurization plant further includes pH meters 21 for measuring the pH value of the circulating absorbing liquid, pressure meters 22 for measuring the pressure drop across the fluidized limestone layer 19, a specific gravity hydrometer 23 for measuring the specific gravity of the absorbing liquid, open-close valves 24 provided at the junctions between the branch pipe 16 and dispersing pipes 17 for limiting the flow of absorbing liquid to selected dispersing pipes 17 and partitions 25 (FIG. 3) for separating limestone in the neutralizing zone into a plurality of divisions. Moreover, a gas flow meter 27 provided in the inlet duct 2 of the desulfurization tower and $SO_2$, concentration meters 28 provided in the inlet duct 2 and outlet duct 3 thereof and the pressure meter 22 and specific gravity hydrometer 23 described above supply signals to a control unit 30, which outputs signals to the open-close valve 31 of the limestone supply pipe 12, the absorbing liquid pumps 5, the open-close valves 24 of the dispersing pipes 17 and the like, to control the same.

Exhaust gas A exhausted from a boiler is introduced from the inlet duct 2 to the desulfurization tower body 1 and is exhausted through the outlet duct 3. At the same time, the absorbing liquid pumped by the absorbing liquid pumps 5 is sprayed into the desulfurization tower through a plurality of spray nozzles 4 for gas-liquid contact between the absorbing liquid and the exhaust gas A. Droplets of the absorbing liquid selectively absorb $SO_2$ from the exhaust gas A to form sulfurous acid. The droplets of absorbing liquid containing sulfurous acid thus formed drop onto the liquid collecting plate 14 arranged within the circulation tank 6. The absorbing liquid falling onto the collecting plate 14 is collected and led to the bottom of the circulation tank 6 through the introducing pipe 15. On the way, sulfurous acid in the absorbing liquid is oxidized to sulfuric acid by oxidizing air B blown in by the air blowing device 8. A plurality of dispersing pipes 17 for homogeneously dispersing upward flow of the absorbing liquid are connected to the bottom portion of an introducing pipe 15 by way of a branch pipe 16. Each dispersing pipe 17 has plural dispersing holes 18 through which the absorbing liquid and air are homogeneously and vigorously ejected to generate an upward flow thereof. Sulfuric acid and limestone are reacted to form gypsum in the fluidized limestone layer 19, but gypsum particles and water alone are discharged from the circulation tank 6 through an absorbing liquid outlet 20 at the upper portion thereof by the rising flow of the absorbing liquid, while limestone is selectively retained in the circulation tank 6, since the gypsum particles are smaller than the limestone particles.

FIGS. 2 and 3 show the detailed structure of a portion of the circulation tank 6 where the limestone layer 19 resides, wherein FIG. 2 is a side view while FIG. 3 is a cross-sectional view taken along a line A—A in FIG. 2. In this embodiment the branch pipe 16 is connected to a side surface of the bottom of the introducing pipe 15, and a plurality of dispersing pipes 17 are arranged uniformly across the entire bottom plane of the circulation tank 6, all connecting to the branch pipe 16. Partitions 25 separate the dispersing pipes 17 from one another and the limestone particles in the neutralizing zone into a plurality of divisions. Moreover, the absorbing liquid is independently supplied to each division by way of the open-close valves 24 each provided at a junction between a dispersing pipe 17 and the branch pipe 16 so that the outlet velocity of the absorbing liquid from the dispersing holes 18 may be kept above a given level, even if the circulating amount of the absorbing liquid is decreased. Further, the pressure drop across the fluidized limestone layer 19 in each division and the specific gravity of the absorbing liquid are measured by the pressure meters 22 and the specific gravity hydrometer 23, respectively. Although only one pressure meter 22 is shown, one is provided in each division.

As described above, the absorbing liquid thus neutralized in the neutralizing zone to recover a certain pH value is again fed to the spray nozzles 4 from an outlet 20 located in an upper portion of the circulation tank 6, through absorbing liquid draining pipes 10, to absorb $SO_2$ from the exhaust gas A as illustrated in FIG. 1. A part of the absorbing liquid is fed to the pH meters 21 to measure the pH value of the absorbing liquid after neutralization. Further, a part of the absorbing liquid is fed to a dehydrator 13 to collect gypsum C. Limestone D ground by a grinder, not shown, into particles each having a given diameter is supplied to the circulation tank 6 through the limestone supply pipe 12.

Figure 4:
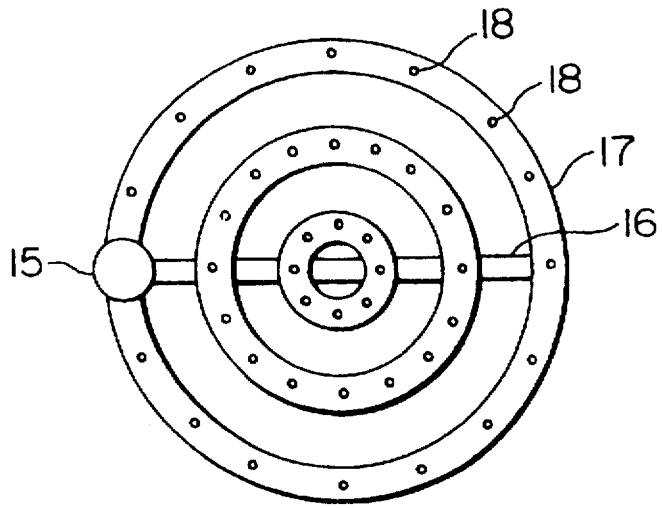
FIG. 4 is a sectional view of a modified example of the neutralizing zone taken along a line A—A in FIG. 2.
Figure 5:
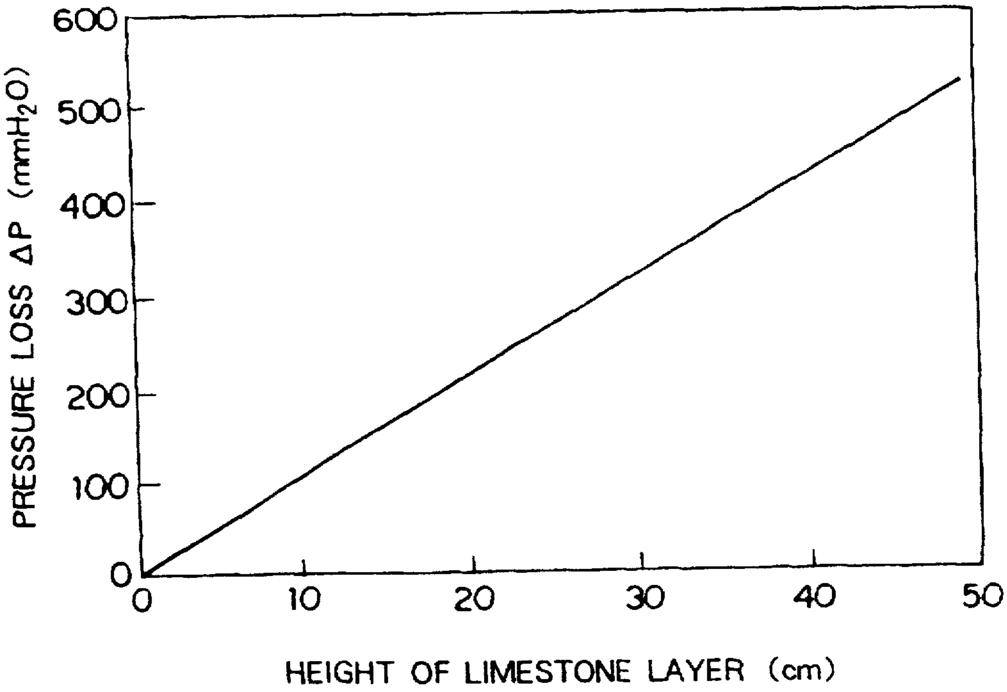
FIG. 5 is a graph showing a relationship between the height of the limestone layer and pressure drop according to the present invention.

In case the circulation tank 6 has a cylindrical shape, the introducing pipe 15, the branch pipe 16, the dispersing pipes 17 and the dispersing holes 18 provided in the dispersing pipes 17 can be arranged as illustrated in FIG. 4 which is a cross section taken along line A—A in FIG. 2. Moreover, open-close valves 24 are provided at junctions between the branch pipe 16 and the dispersing pipes 17 as illustrated in FIGS. 1 and 2, although they are not shown in FIG. 4.

This embodiment has the feature that the rising flow of the absorbing liquid through the limestone layer 19 in the neutralizing zone inside the circulation tank 6 eliminates the need for equipment such as a stirring device for agitating the limestone, a mounting therefor and the need for power to drive the same.

Figure 6:
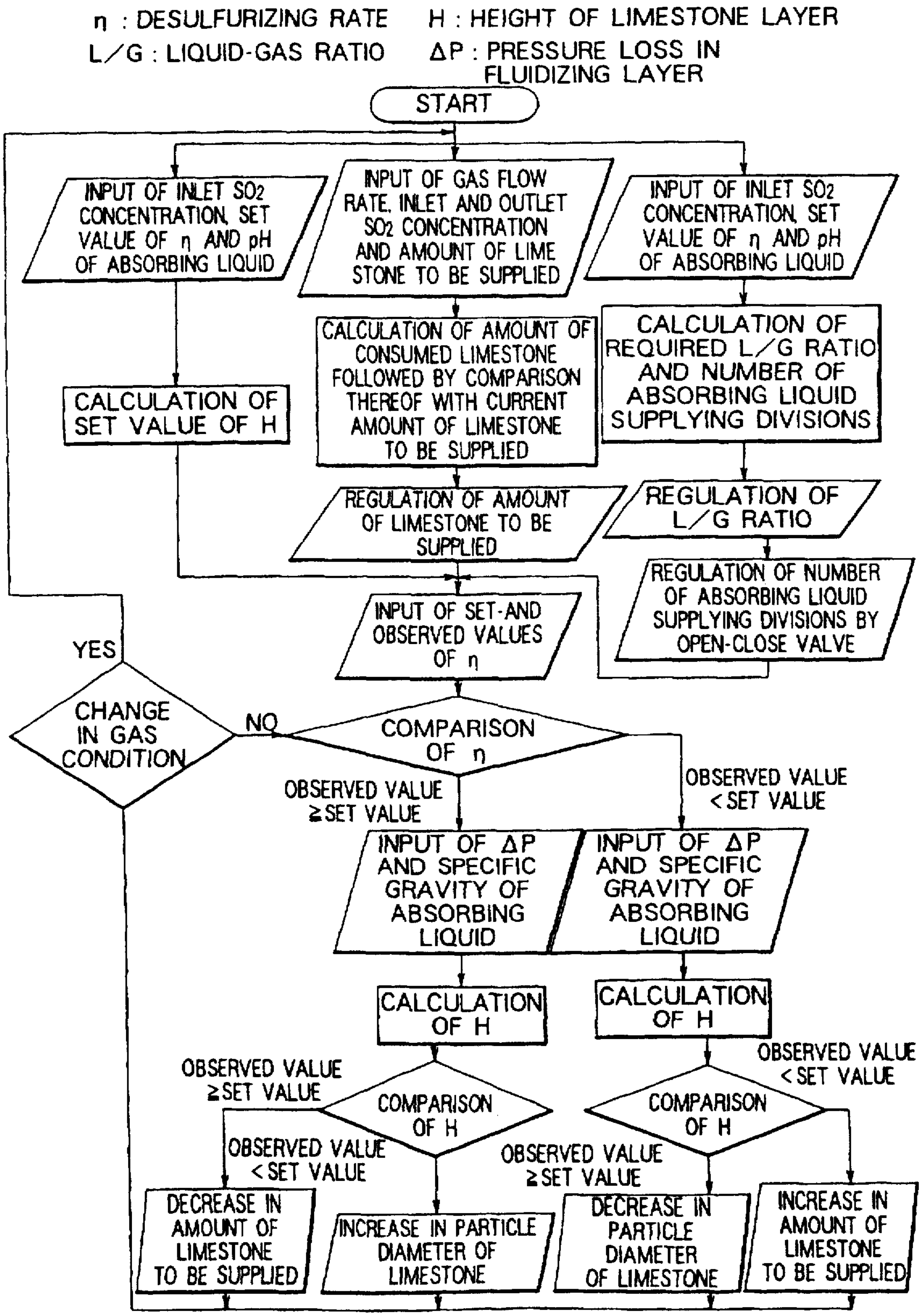
FIG. 6 is a flow-chart of a process for controlling the desulfurizing plant according to the first example illustrated in FIG. 1.

FIG. 6 shows a flowchart of process control of the desulfurization plant according to this example.

The amount of limestone consumed and, accordingly, the amount of gypsum formed can be determined from the gas flow rate at the inlet duct 2, $SO_2$ concentration at the inlet duct 2 and that at the outlet duct 3 in the desulfurization tower. The actual amount of limestone supply is regulated so that the actual measurements of consumption of limestone may conform to the calculations. On the other hand, the liquid-gas ratio (L/G: a ratio of exhaust gas and absorbing liquid contacting with the exhaust gas) can be controlled in accordance with the circulating amount of the absorbing liquid, the $SO_2$ concentration at the desulfurization tower inlet duct 2, a predetermined set value for desulfurizing rate and the pH value of the absorbing liquid after neutralization, by changing the number of divisions to which absorbing liquid is supplied so that the L/G becomes equal to the calculated value. The number of divisions to which the absorbing liquid is supplied is changed by opening/closing the open-close valves 24 for specific divisions.

Figure 7:
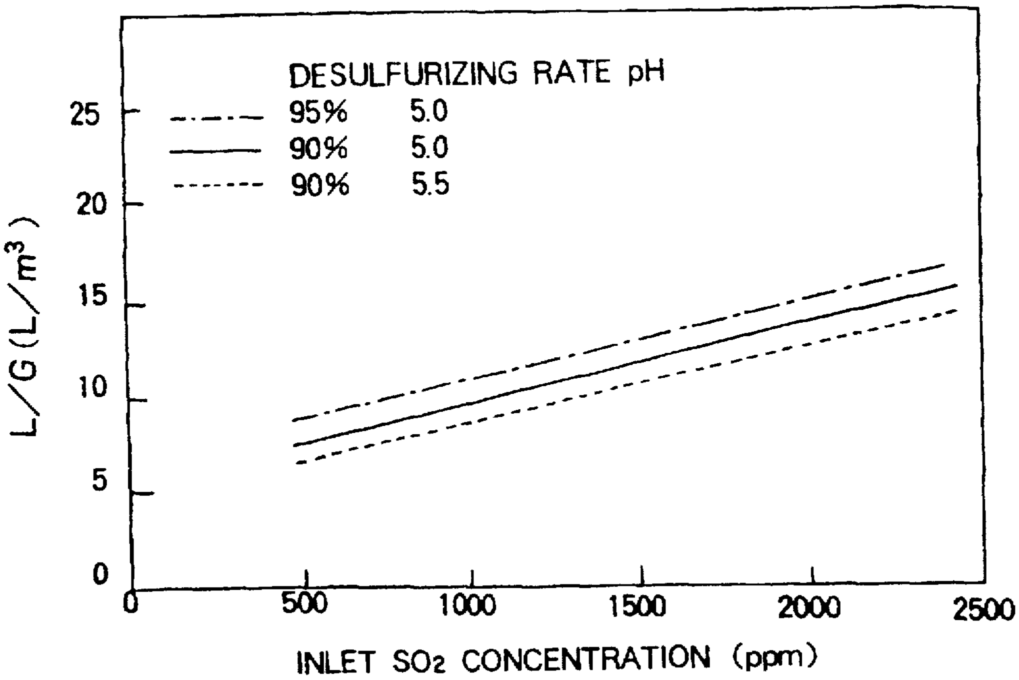
FIG. 7 shows a result of the process control of FIG. 6.

FIG. 7 shows an example of a relationship between the L/G and the inlet $SO_2$ concentration, wherein as the set values of desulfurizing rate and the $SO_2$ concentration at the desulfurization tower inlet duct 2 rise, i.e., as the pH of the absorbing liquid after neutralization becomes lower, the larger the necessary L/G becomes. However, the relationship between the necessary L/G and these factors is also affected by the structure of the desulfurization tower and by trace constituents contained in the exhaust gas, so that the relationship as illustrated in FIG. 7 should be obtained in advance. The L/G in the desulfurization tower is mainly controlled by changing the number of absorbing liquid pumps 5 in operation.

When the L/G changes, the open-close valves 24 are controlled to maintain the outlet velocity of the absorbing liquid from the dispersing holes 18 within a given range. When the outlet velocity of the absorbing liquid from the dispersing holes 18 is too large, the limestone D exits the neutralizing zone together with the particles of gypsum C so that the quality of the gypsum C deteriorates. On the other hand, when it is too low, the fluidization of the limestone becomes poor, so that the desulfurizing rate ($\eta$) is reduced.

As described above, even if the operating conditions are determined, the desulfurizing rate ($\eta$) sometimes differs from the previously set value. One of the reasons is that error (error in measurement of the gas flow rate and the $SO_2$ concentration) in determination of the amount of the limestone D consumed, obtained from the gas flow rate at the inlet duct 2 of the desulfurization tower and the $SO_2$ concentrations at the inlet duct 2 and outlet duct 3, results in variation of the amount of limestone residing in the neutralizing zone.

Moreover, there is the possibility that a variation in the particle diameters of the limestone D supplied to the circulation tank 6 through the limestone supply pipe 12 (a variation in the crushability of the limestone itself or in the grinding operation) may cause such a difference.

In order to solve such a problem, according to this example, the supply amount and particle diameter of limestone D are regulated based on the differences between the set values and the measured values for the desulfurizing rate and the height of limestone layer H. The height of the limestone layer H is calculated by substituting the pressure drop ($\Delta P$) across the fluidized limestone layer 19, as measured by the pressure meter 22, and the specific gravity of the absorbing liquid, as measured by hydrometer 23, into the following equation:

$\Delta P$=(specific gravity of limestone−specific gravity of absorbing liquid)×height of limestone layer×(1−void rate).

Figure 8:
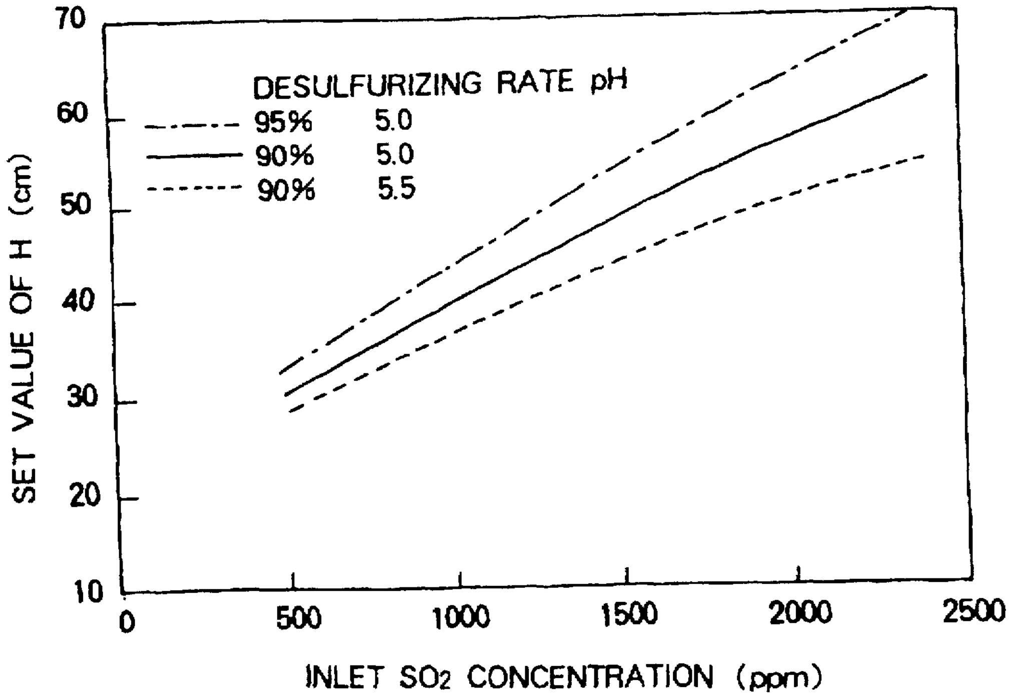
FIG. 8 is a graph showing a relationship between $SO_2$ concentration in the inlet gas and the height of the limestone layer H predetermined for different desulfurizing rates.

The particle diameter of limestone D may be regulated by the method of the prior art such as changing the amount of limestone D supplied to a grinder (not shown), changing an operating condition of the grinder or the like. The height of limestone layer H needs to be preset based on the inlet gas condition and the desulfurizing rate. FIG. 8 shows an example, wherein the inlet gas condition (gas flow rate and $SO_2$ concentrations at the inlet and outlet of the desulfurization tower) changed more than a given amount, and supply amount of limestone was changed again based on the new inlet gas condition.

Figure 9:
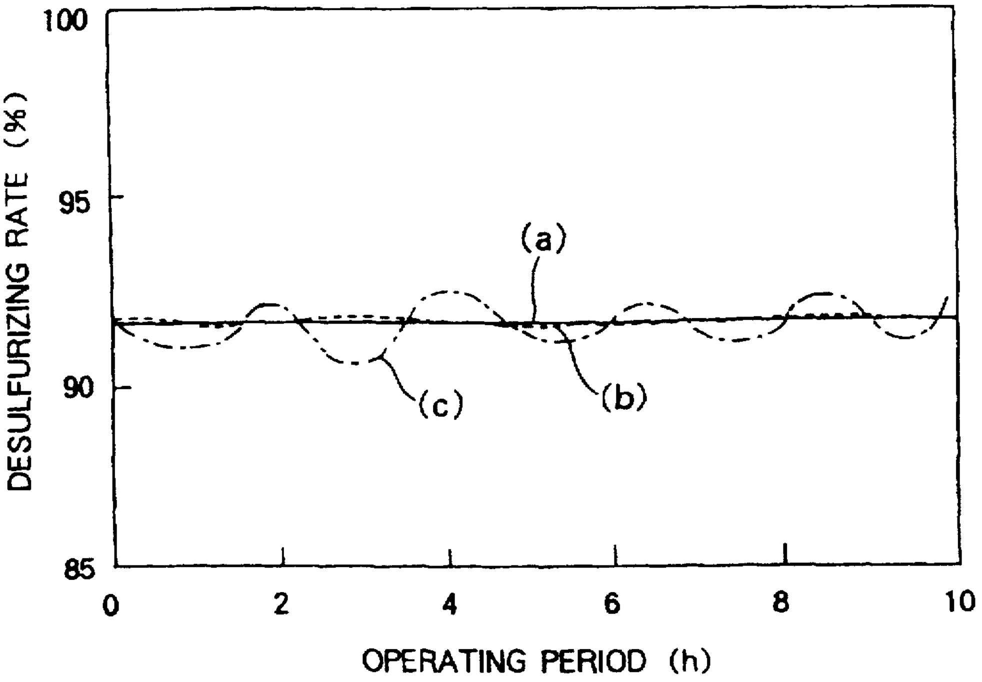
FIG. 9 is a graph showing the variation of a desulfurizing rate with time in the first example (solid line (a)), the second example (broken line (b)) and Comparative example 1 (one-dotted line (c))

Using limestone having a weight-average particle diameter of 2 mm (height of limestone layer H=50 cm), a desulfurizing test was carried out in the plant according to this embodiment. With the amount of exhaust gas constant at the inlet of the desulfurization tower, the $SO_2$ in the exhaust gas A was controlled to be 1,000 ppm and 50 ppm at the inlet and outlet of the desulfurization tower, respectively. The height of limestone layer H was controlled to be constantly 50 cm. A solid line (a) in FIG. 9 represents a change in a desulfurizing rate with time. The $SO_2$ concentration at the outlet was stable. Moreover, the height of limestone layer H was equivalent at the time of starting the test and thereafter.

Second Example

Figure 10:
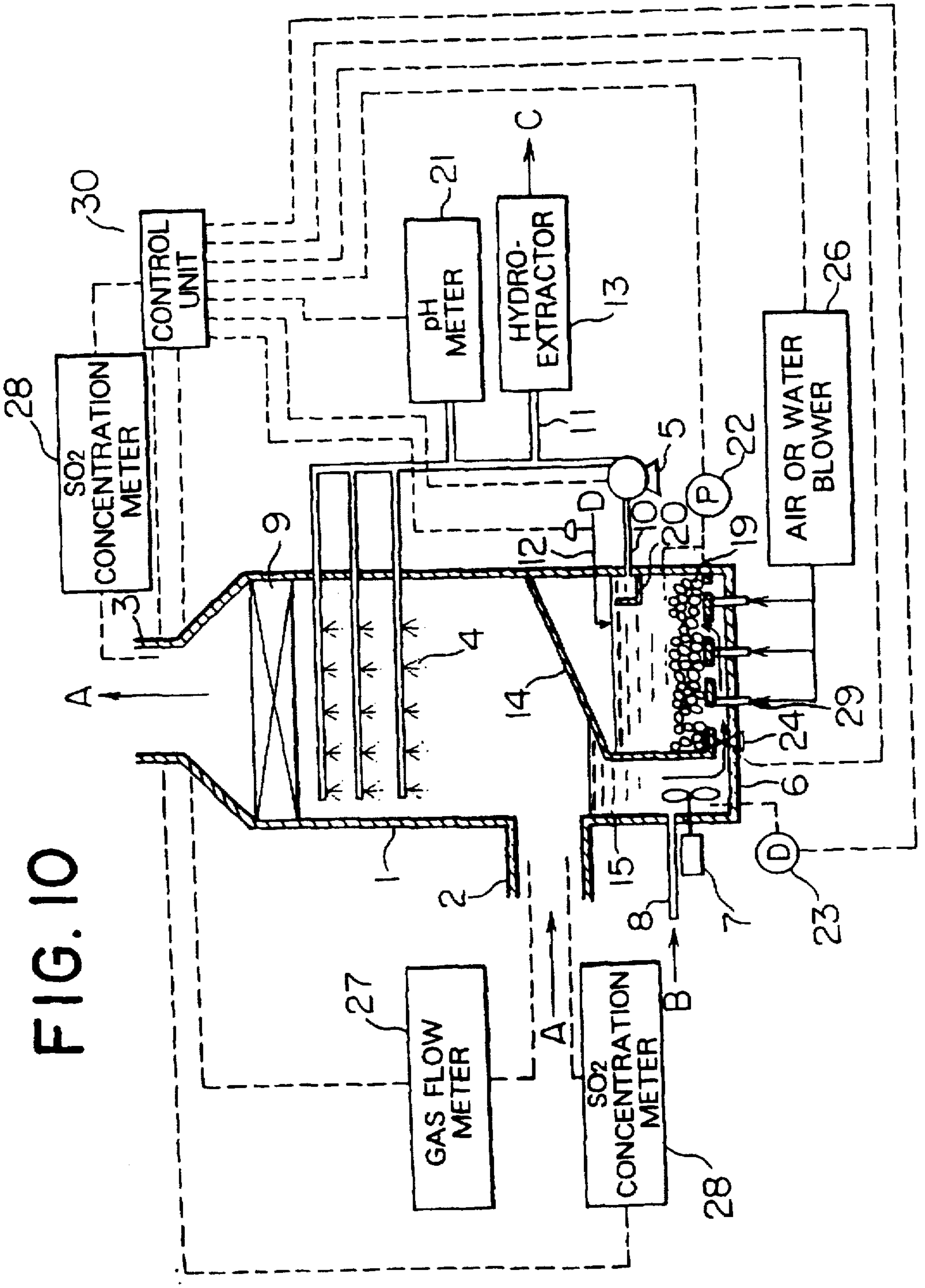
FIG. 10 is a schematic view of a mono-tower wet-type flue gas desulfurization plant according to a second example of the present invention.
Figure 11:
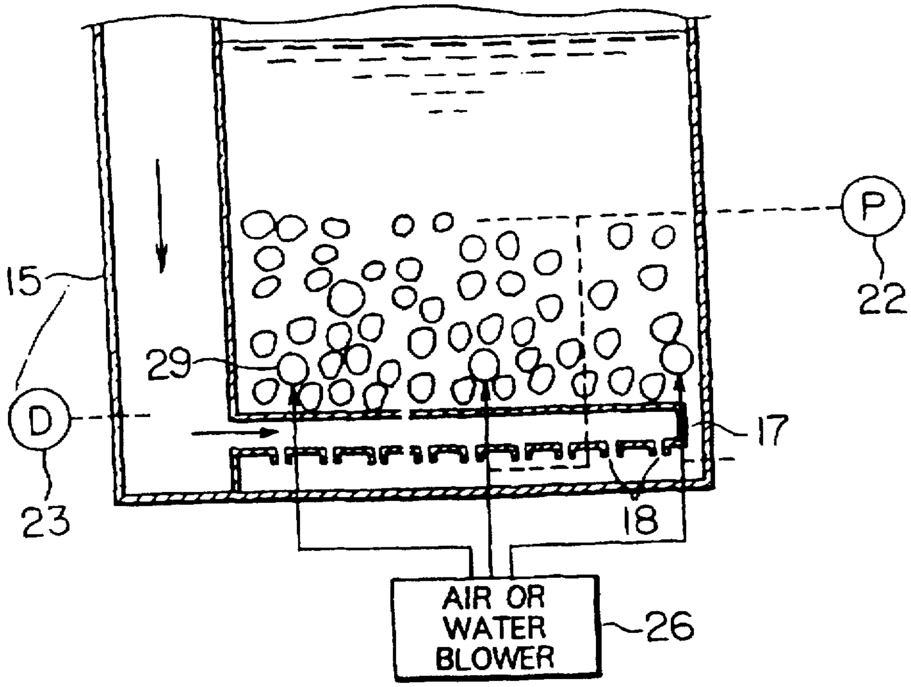
FIG. 11 is an enlarged view of the neutralizing device in FIG. 10.

FIG. 10 shows a desulfurization plant according to this example. A desulfurizing test was conducted using the same device and under the same conditions as those of the first example. In this example, however, an air blower 26 and air tubes 29 are provided for blowing air into the limestone layer 19 in the plant as illustrated in FIG. 1 so as to further agitate the limestone fluidized therein. FIG. 11 is an enlarged schematic view of the neutralizing zone. According to this embodiment, the agitation speed of the limestone layer 19 by way of air is regulated by changing the amount of air supplied to the neutralizing zone, instead of regulating the particle diameter of limestone D. It is also possible to jet water into the limestone layer 19 instead of air.

Figure 12:
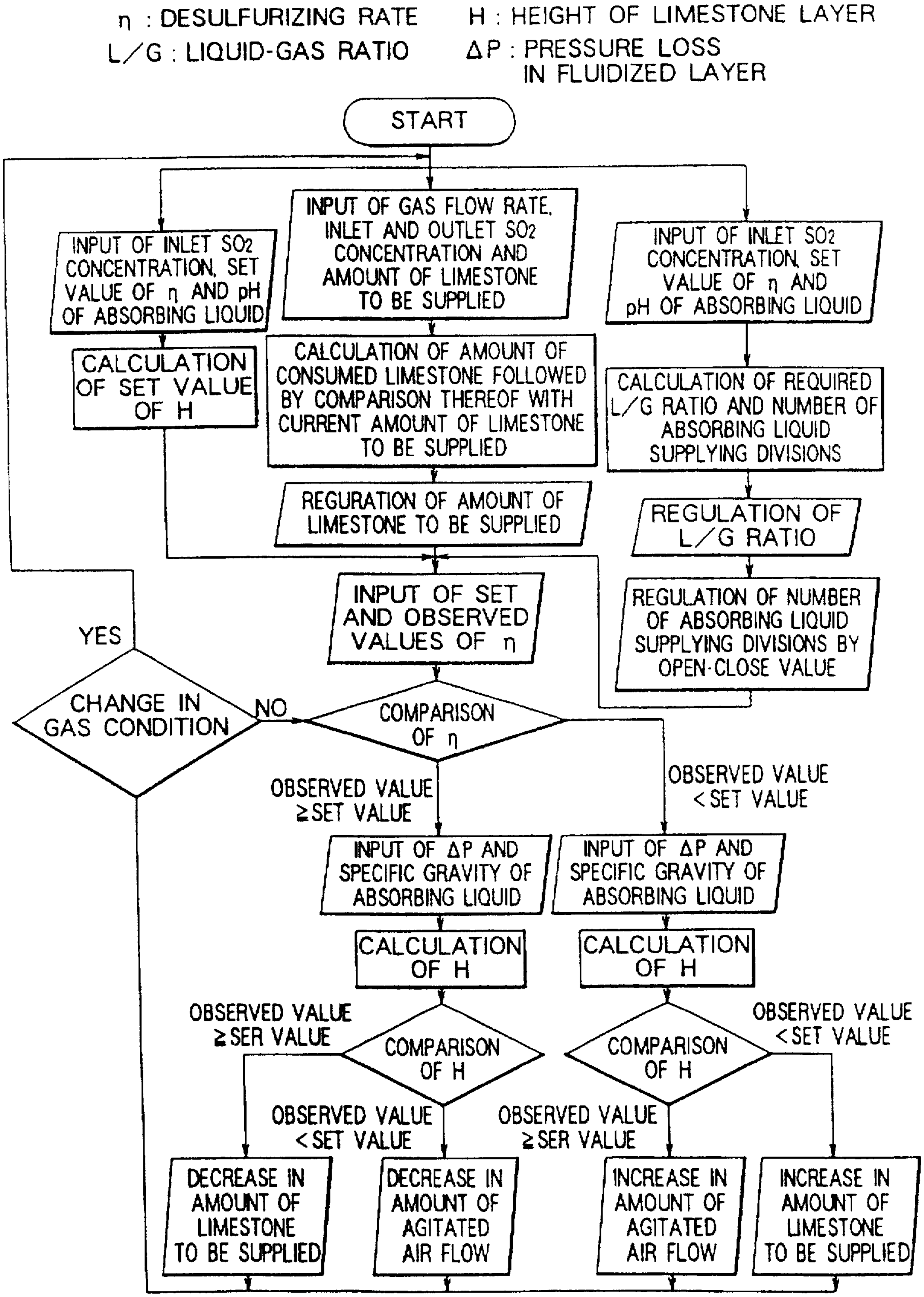
FIG. 12 is a flowchart for process control of the mono-tower wet-type flue gas desulfurization plant according to the second example as illustrated in FIG. 10.

A flow chart of process control used in this embodiment is shown in FIG. 12. A change in the desulfurizing percentage with time is shown by a broken line (b) in FIG. 9. Similarly, as in the case of the First Example, stable desulfurizing performance was obtained, while the height of limestone layer H after the test was the same as that before the test.

Comparative Example 1.

Figure 13:
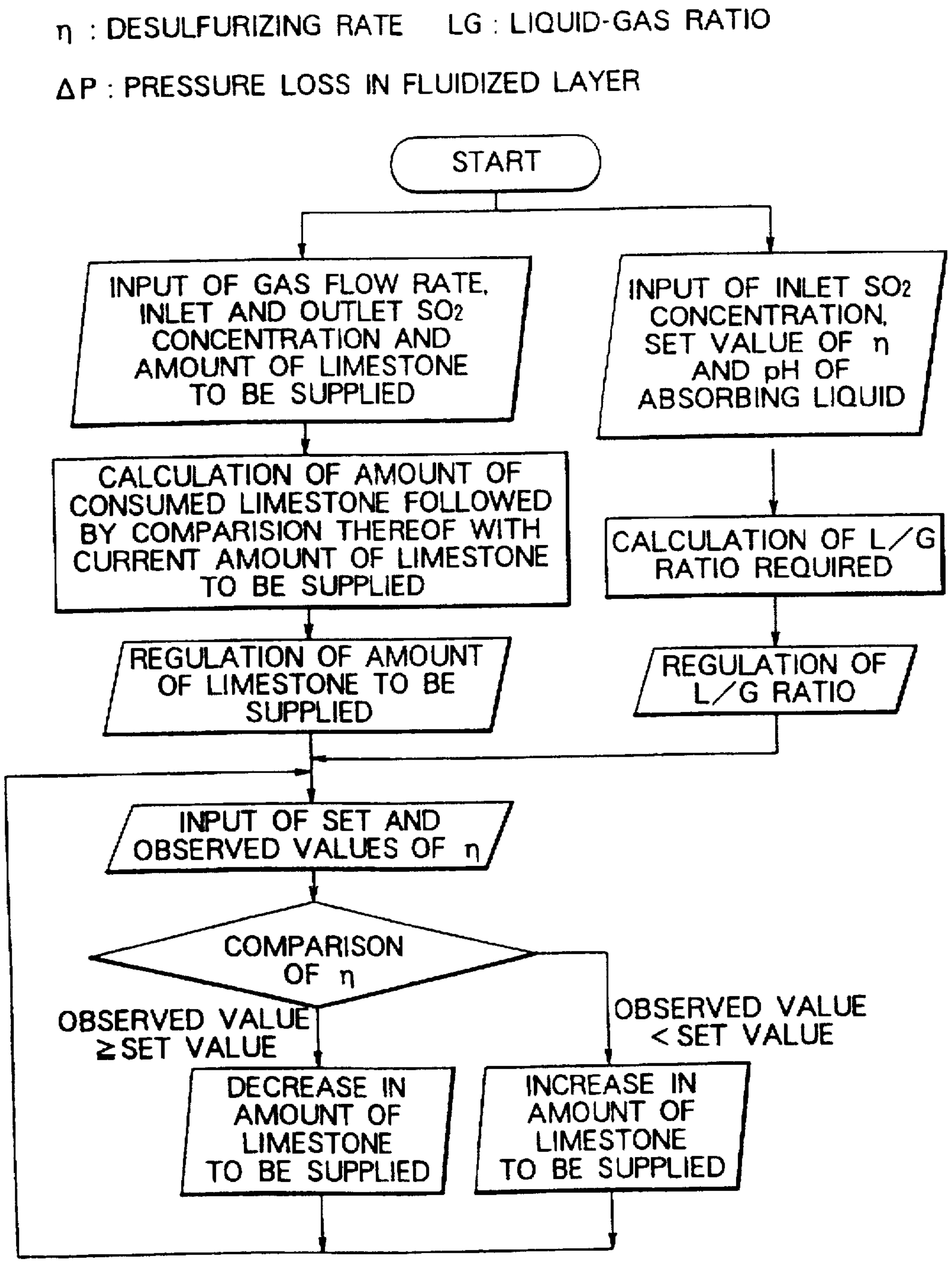
FIG. 13 is a flowchart of process control of the mono-tower wet-type flue gas desulfurization plant used in Comparative Example 1.
Figure 27:
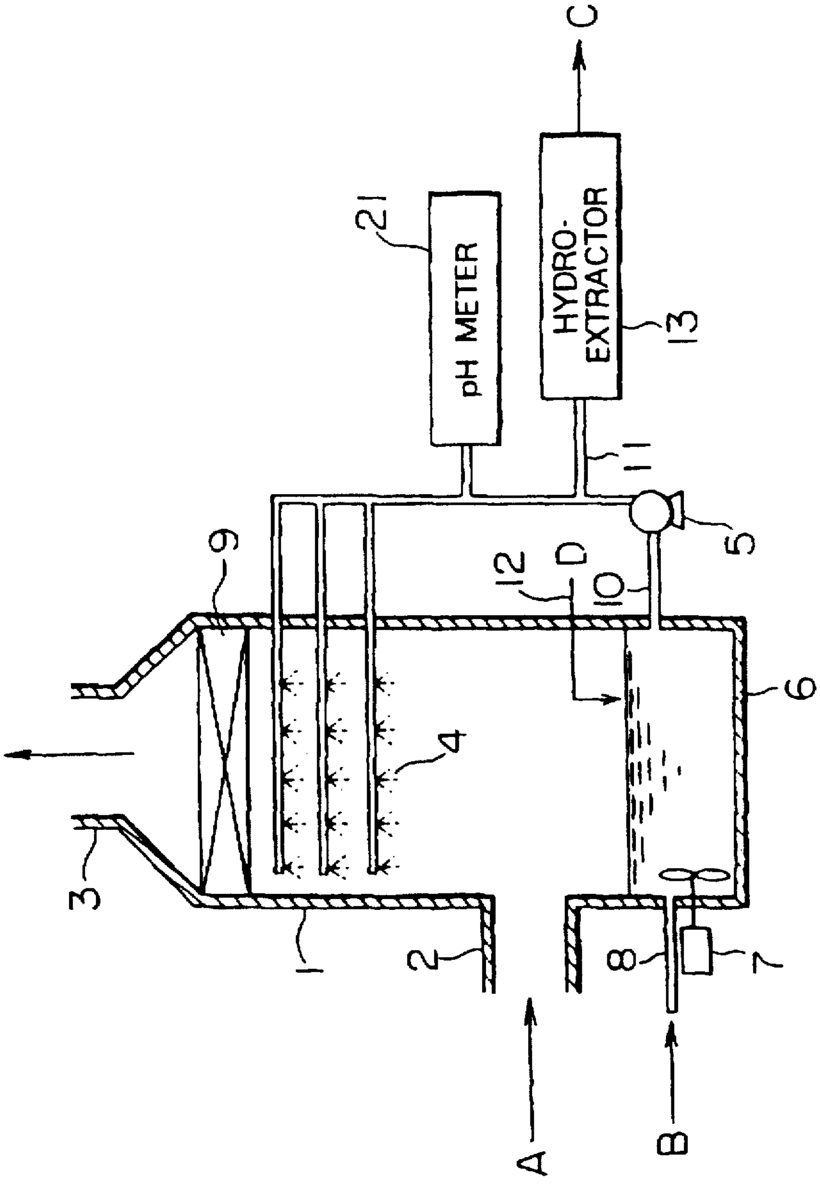
FIG. 27 is a schematic view of a conventional mono-tower wet-type flue gas desulfurization plant.

Using a conventional desulfurization plant as shown in FIG. 27, a desulfurizing test was carried out. As it was impossible to detect the height of a limestone layer in this comparative example, the amount of limestone added was controlled in accordance with the $SO_2$ concentration at an outlet of the desulfurization tower. A flow chart for process control used in this comparative example is shown in FIG. 13. A change in the desulfurizing percentage ($\eta$) with time is shown by a chain line (c) in FIG. 9. Compared with Examples 1 and 2, the desulfurizing performance changed considerably and the height of the limestone layer after the test was about 1.5 times higher than that observed before the test.

Example 3.

Figure 14:
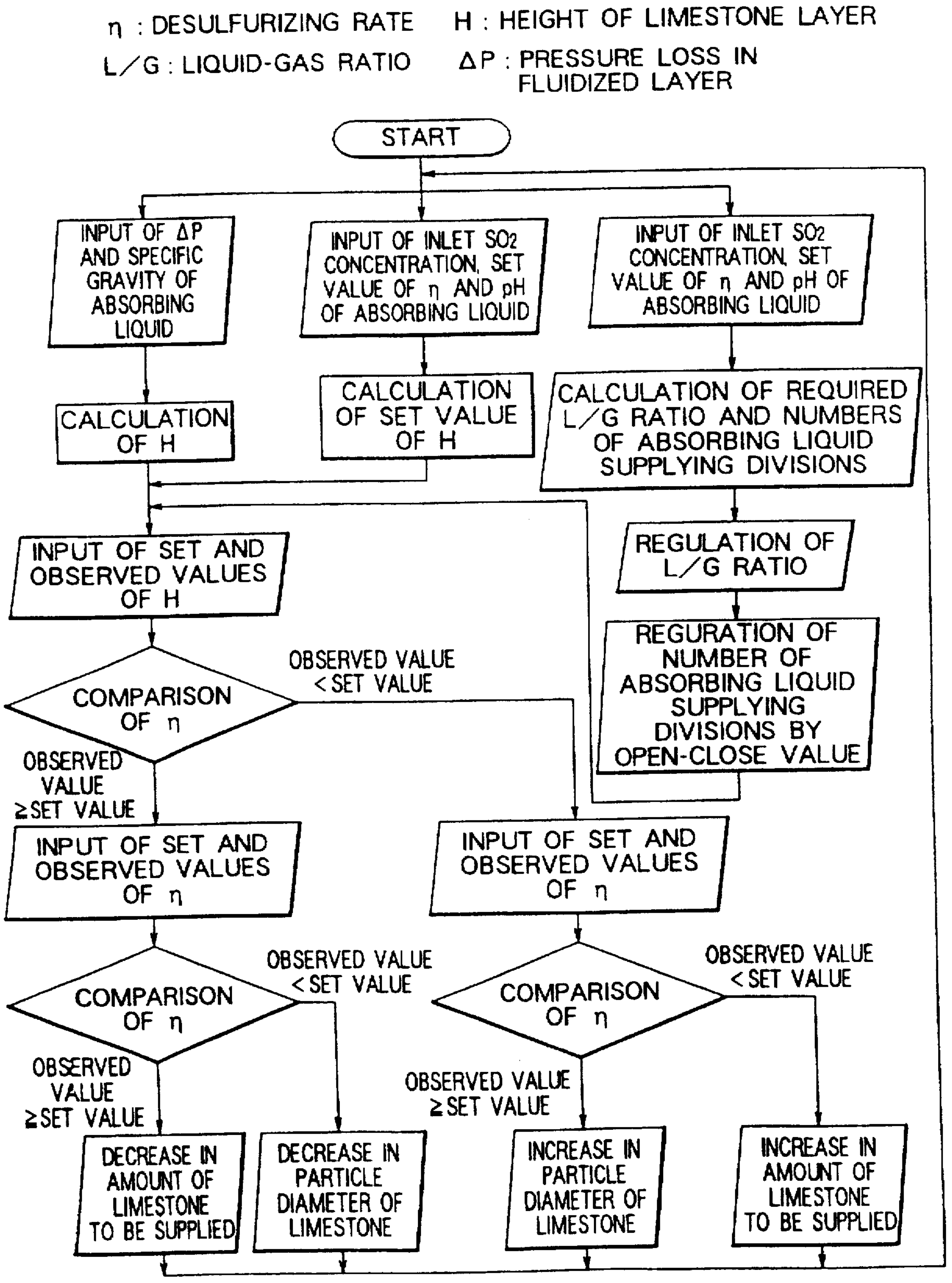
FIG. 14 is a flowchart of process control of the mono-tower wet-type flue gas desulfurization plant used in a third example of the present invention.
Figure 17:
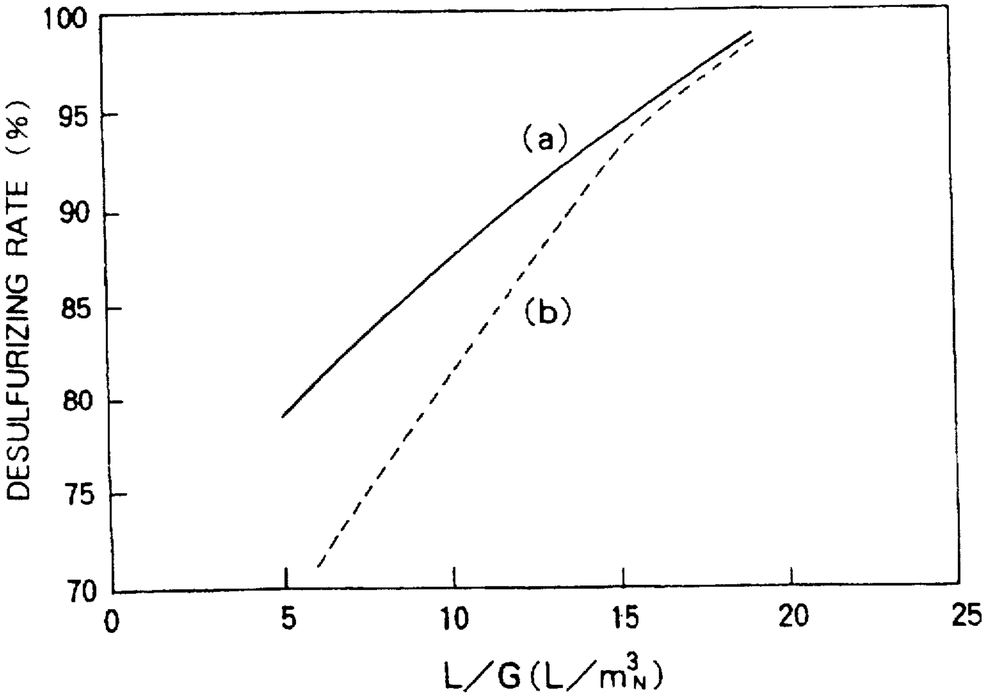
FIG. 17 is a graph of the relationship between the (L/G) and desulfurizing rate in the cases of the third example (solid line (a)) and Comparative Example 3 (broken line (b))

Using the same plant and conditions of the first Example, a desulfurizing test was carried out. The amount of limestone to be supplied was not controlled by conditions of inlet gas (gas flow rate and $SO_2$ concentration at the inlet and outlet of the desulfurization tower); rather, both such an amount and particle diameter thereof were controlled on the basis of the height of the limestone layer determined by pressure drop (ΔP) across the limestone layer 19 and specific gravity of the absorbing liquid in this example. When the circulation rate of the absorbing liquid was changed (L/G control), the rate of upward flow of the absorbing liquid in the absorbing liquid supply divisions within the neutralizing zone was controlled to be at least 4 cm/second by means of operation of open-close valves 24. A flow-chart of process control used in this example is shown in FIG. 14. Similarly, as in the case of the first Example, stable desulfurizing performance (the same curve as the solid line (a) in FIG. 9) was obtained, while the height of limestone layer H after the test was the same as that of before the test. The relationship between the desulfurizing performance and the L/G in this example is shown by a solid line (a) in FIG. 17.

Comparative Example 2.

Figure 15:
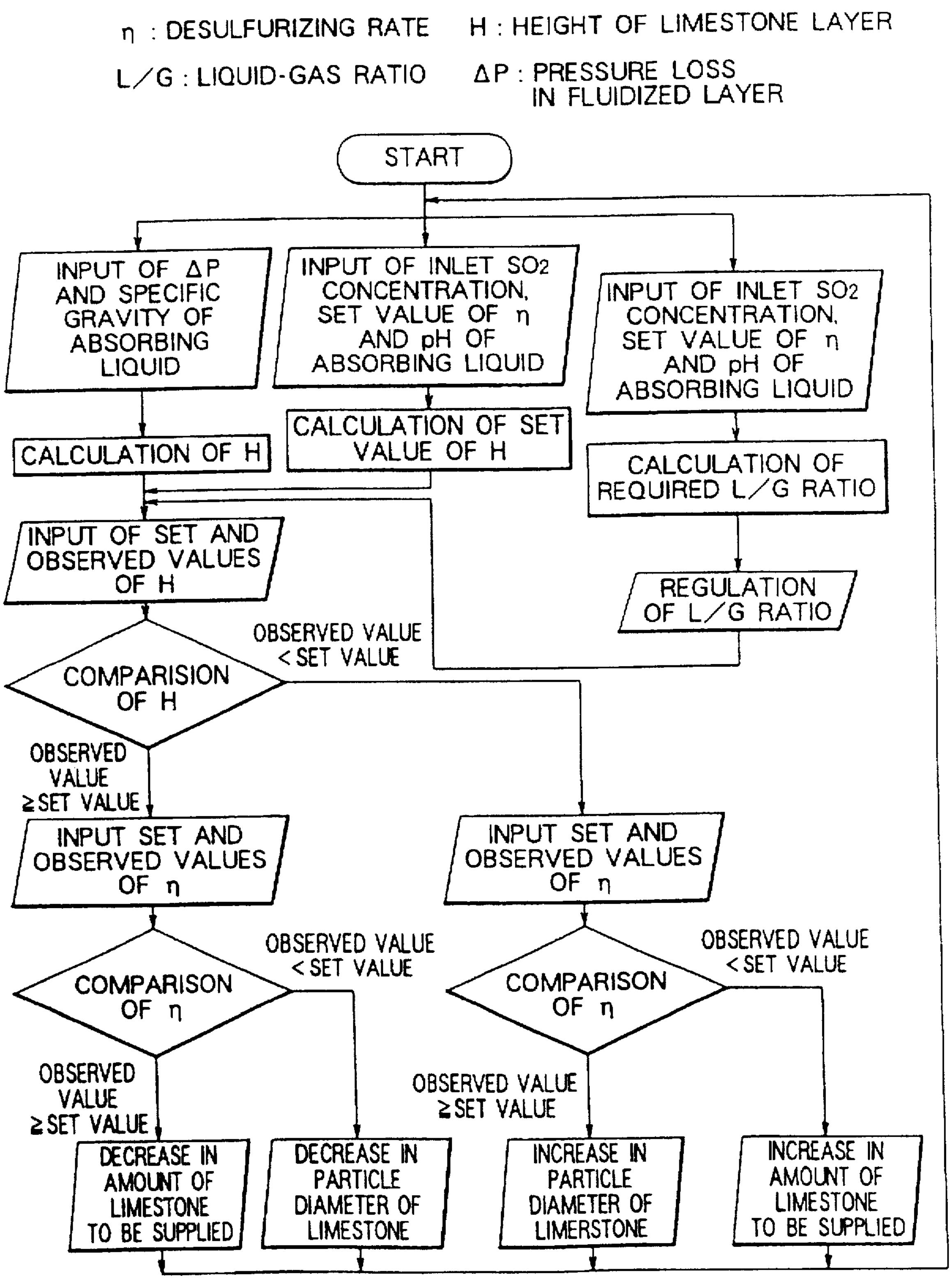
FIG. 15 is a flowchart of process control of the mono-tower wet-type flue gas desulfurization plant used in Comparative Example 2.

Using the same plant and conditions as Example 3, a desulfurizing test was carried out, except that the number of the absorbing liquid supplying divisions in the neutralizing zone was not controlled. A flow-chart of process control used in this comparative example is shown in FIG. 15.

Figure 16:
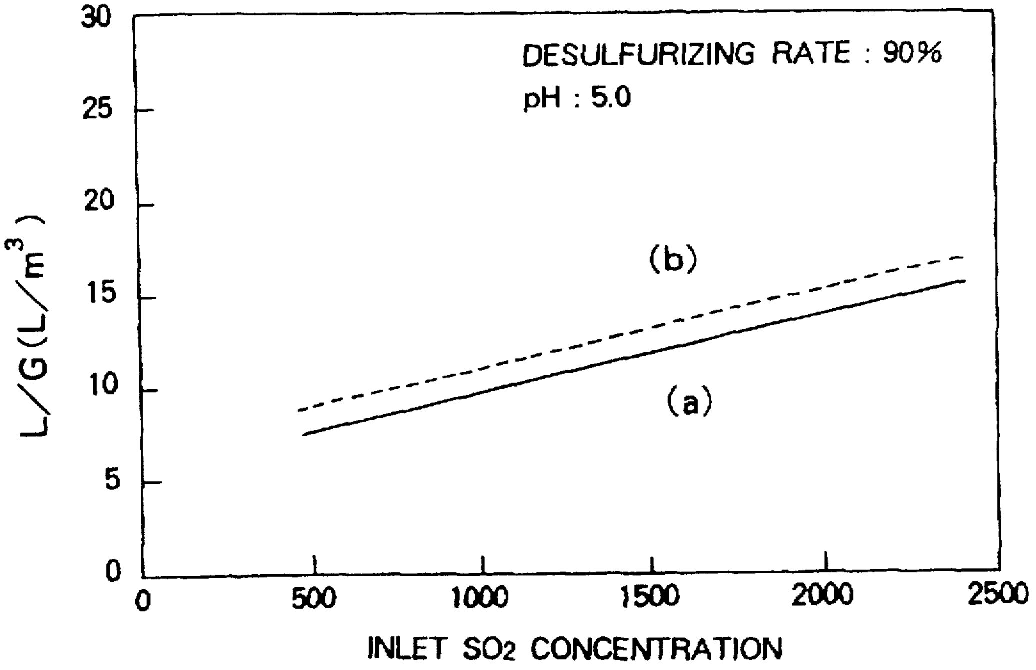
FIG. 16 is a graph of the relationship between an inlet $SO_2$ concentration and liquid-gas ratio (L/G) in the cases of the third example (solid line (a)) and Comparative Example 3 (broken line (b))

The relationship between the inlet $SO_2$ concentration and the L/G in cases of Example 3 and Comparative Example 2 is shown by a solid line (a) and a broken line (b) in FIG. 16, respectively. Apparently, a L/G value at the same inlet $SO_2$ concentration in Comparative Example 2 where the number of the absorbing liquid supplying divisions within the neutralizing zone was not controlled was higher than that of Example 3.

Comparative Example 3.

Using a desulfurization plant as shown in FIG. 27, the desulfurizing performance was tested under the same conditions as in the case of Example 3. The result obtained is shown by a broken line (b) in FIG. 17. Compared with the result of Example 3 as shown by a solid line (a) in the same figure, decrease in the desulfurizing percentage in this comparative example is more remarkable at a lower L/G ratio. It can presumed that limestone is fluidized insufficiently when the L/G decreases (i.e., when the amount of liquid decreases because that of the gas is constant).

Example 4.

Figure 18:
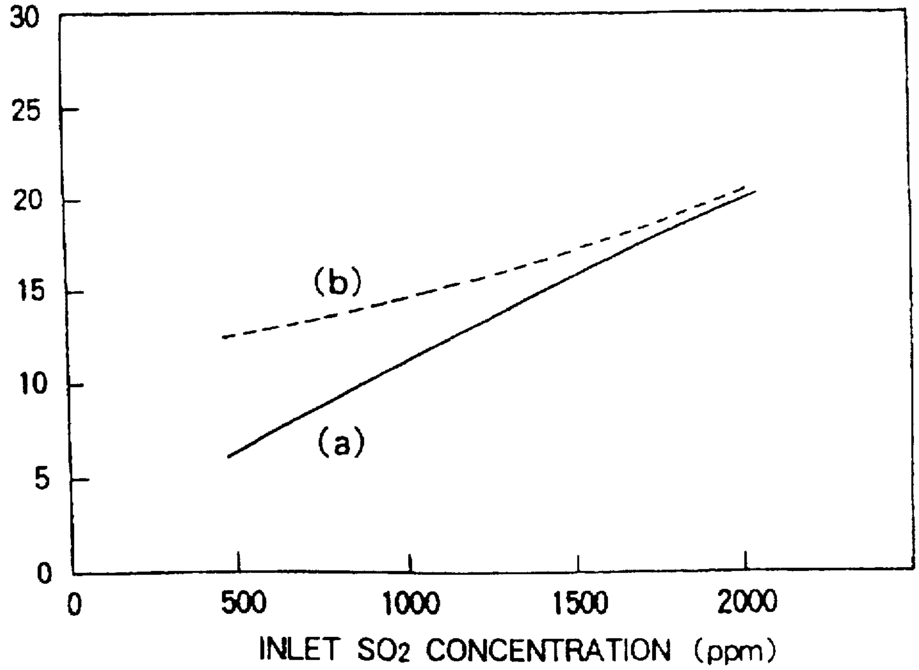
FIG. 18 is a graph of the relationship between the (L/G) and the inlet $SO_2$ concentration for obtaining a desulfurizing rate of 90% in cases of a fourth example (solid line (a)) and Comparative Example 4 (broken line (b))

Using the same desulfurization plant as in the case of the first Example, the desulfurizing performance was tested over a range of the inlet $SO_2$ concentration from 200 to 2,000 ppm. The relationship between the L/G ratio and the inlet $SO_2$ concentration yielding a desulfurizing percentage of 90°% is shown by a solid line (a) in FIG. 18.

Comparative Example 4.

Using a desulfurization plant shown in FIG. 27, the desulfurizing performance was tested under the same conditions as in the case of Example 4. Compared with Example 4, the L/G ratio does not decrease readily when the inlet $SO_2$ concentration decreases. It can presumed that limestone is fluidized insufficiently when the L/G decreases (i.e., when the amount of liquid decreases because that of the gas is constant).

Example 5.

Figure 19:
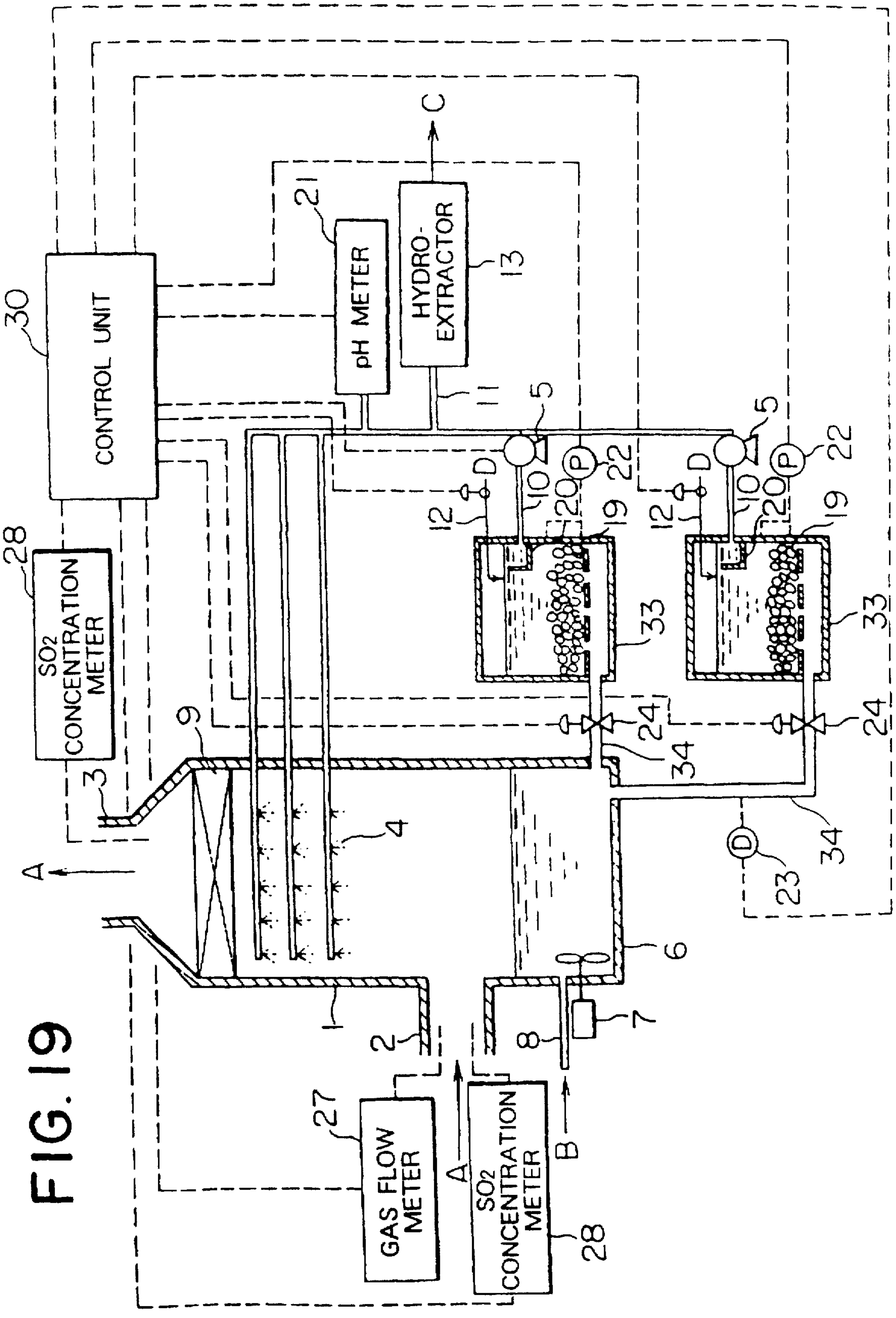
FIG. 19 is a schematic view of a mono-tower wet-type flue gas desulfurization plant according to a fifth example of the present invention.

The desulfurization plants used in Examples 1 to 4 have structure whereby limestone is fluidized in a circulation tank 6 and the interior of the tank is divided. On the other hand, as shown in FIG. 19, plural neutralizing units 33 are arranged independently from a desulfurization tower body 1 and connected to a circulation tank 6 by means of connecting pipes 34. Each connecting pipe 34 is provided with an open-close valve 24 to jet the absorbing liquid out through dispersing holes of dispersing pipes (not shown; the same as those used in FIGS. 2 and 3) arranged above the bottoms of the neutralizing units 33. Instead of, or together with, ejection of the absorbing liquid through the dispersing holes on the dispersing pipes, an air or water blower 26 and air or water injection tubes 29 may be provided as shown in FIGS. 10 and 11. The neutralizing unit 33 arranged independently from the desulfurization tower body 1 may be plural or single, or the interior of a single neutralizing unit 33 can be divided as in the first Example (see FIGS. 2 and 3).

A flow chart of process control in this example is the same as FIG. 6. In this case, the open-close valve 24 of the dispersing pipe 17 in FIG. 1 corresponds to the open-close valve 24 of the connecting pipe 34 in FIG. 19.

A separator may be arranged between the neutralizing unit 33 and circulation pumps 5 for separating limestone D from gypsum C in the desulfurization plant shown in FIG. 19.

Example 6.

Figure 20:
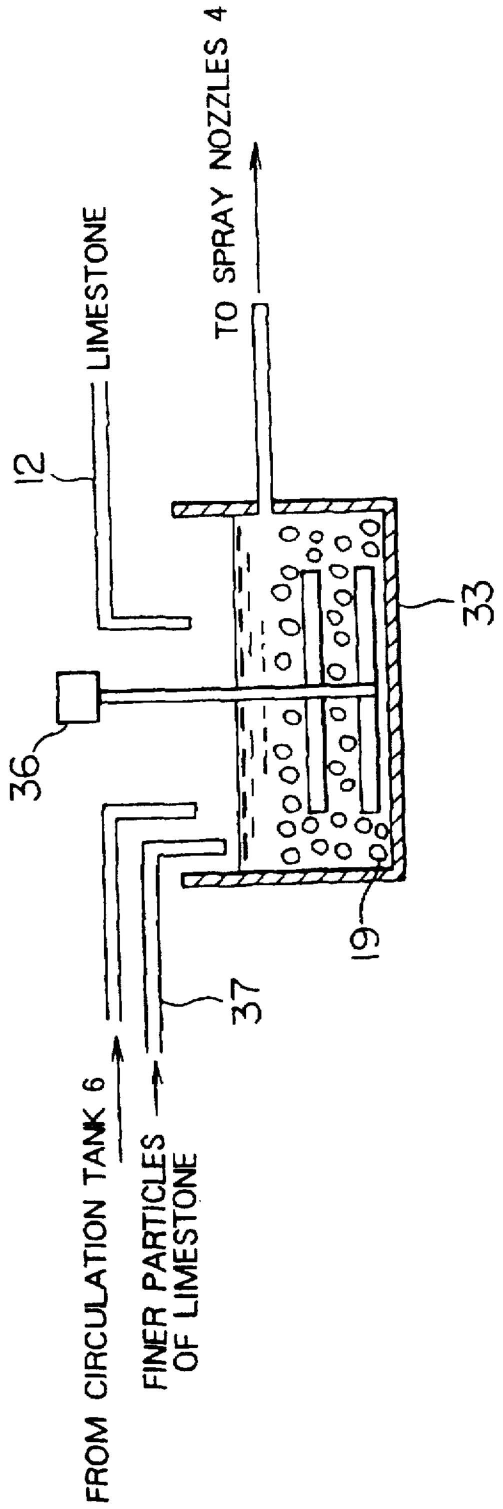
FIG. 20 is a schematic view of a neutralizing device according to sixth and seventh examples of the present invention.

In this example, a limestone layer 19 in a neutralizing unit 33 is agitated by a stirrer 36 instead of forming a jet flow of the absorbing liquid by means of the dispersing pipe 17 of the neutralizing unit 33 or blowing air therein. An enlarged view of the neutralizing unit 33 is shown in FIG. 20.

Limestone having a weight-average particle diameter of 1 mm or more is loaded to form a fluidized bed thereof in the neutralizing unit 33. These limestone particles and gypsum particles (having a weight-average particle diameter of 10 to 100 μm) are easily separated because of the considerable difference between particle diameters thereof. Accordingly, the amount of limestone in the neutralizing unit 33 does not affect the quality of the gypsum product and the greater the amount of limestone in the bed, the shorter the time for neutralizing the absorbing liquid. Preferably the ratio of the absorbing liquid to limestone is 9:1 to 6:4 by weight.

Limestone of a coarser particle diameter is continuously agitated in the absorbing liquid by means of a stirrer 36. The absorbing liquid is supplied to the neutralizing unit 33 from a circulation tank 6 (see FIG. 19), while limestone is supplied from a limestone supply pipe 12. Structure in which limestone of a finer particle diameter is also supplied as needed from a limestone supplying pipe 37 may also be used. A flow-chart of process control used in this example is the same as that of FIG. 6, but "ΔP, specific gravity of absorbing liquid input" is substituted for "torque of stirrer". The correlation between torque of the stirrer 36 and height of the limestone layer should be determined in advance in this case.

Using the present plant described above, a desulfurizing test was carried out. The $SO_2$ concentration in the exhaust gas at an inlet of the desulfurization tower was 1,000 ppm. Limestone (having a weight average particle diameter of 5 mm) was loaded in advance in the neutralizing unit 33 in an amount equimolar to the $SO_2$ in the exhaust gas A introduced for two hours, and further supplied thereto in the amount of 0.97 mole per mole of $SO_2$ in the exhaust gas, through the limestone supply pipe 12. The amount of air blown into the circulation tank 6 gave a mole ratio of air to $SO_2$ in the exhaust gas of 30.

Figure 21:
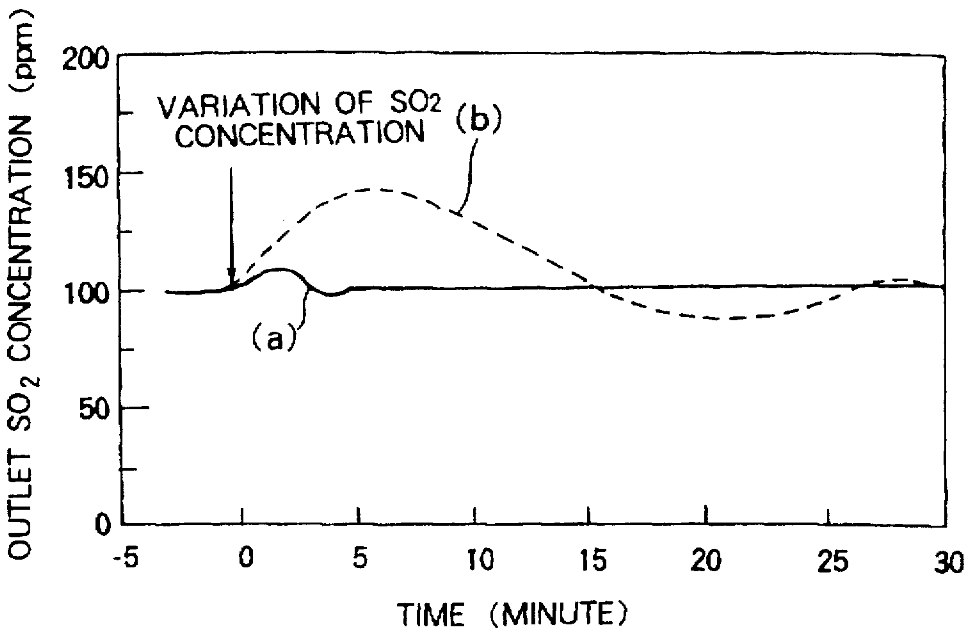
FIG. 21 is a graph of outlet $SO_2$ concentration as varying with (L/G) alone in the cases of the sixth example (solid line (a)) and the fifth example (broken line (b))

Change in the outlet $SO_2$ concentration of the desulfurization tower with change in the inlet $SO_2$ concentration is shown by a solid line (a) in FIG. 21. In this case, the pH value of the absorbing liquid pumped out of the neutralizing unit 33 was determined by pH meters 21 (see FIG. 19) to control rotational speed of the stirrer 36 so as to keep the pH value approximately constant before and after the change in the inlet $SO_2$ concentration, while the outlet $SO_2$ concentration was determined and the L/G ratio changed so as to control such concentration. It is observed from the figure that the outlet $SO_2$ concentration varies within a small range and recovers an initial set value in a short period of time, even when the inlet $SO_2$ concentration changes.

Comparative Example 5.

The procedure of Example 6 was repeated, but rotational speed of the stirrer 36 was kept constant when the inlet $SO_2$ concentration of the desulfurization tower changed, while the L/G ratio was changed to control the outlet $SO_2$ concentration, the L/G ratio being regulated predominantly by controlling the number of absorbing liquid pumps 5 in operation. The result thus obtained is shown by a broken line (b) in FIG. 21. Compared with Example 6, a marked variation in the outlet $SO_2$, concentration is observed and it takes a longer time to recover the initial set value in this comparative example.

Example 7.

Figure 22:
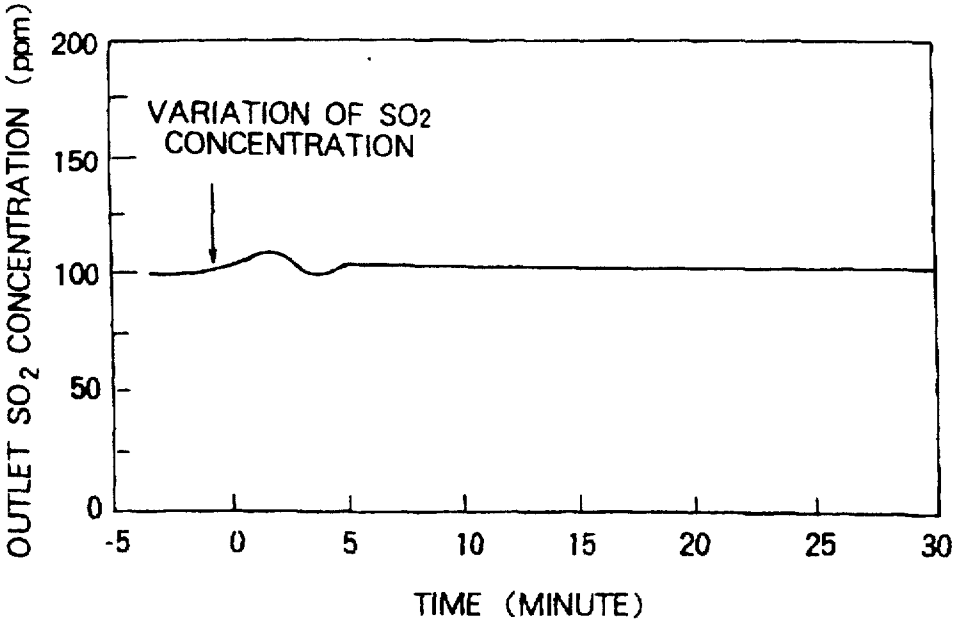
FIG. 22 is a graph showing variation of the outlet $SO_2$ concentration according to the seventh example of the present invention.

The procedure of Example 6 was repeated, but rotational speed of the stirrer 36 was kept constant while the inlet $SO_2$ concentration of the desulfurization tower changed, with limestone having a weight-average particle diameter of 10 μm (hereinafter referred to as finer limestone) supplied to neutralizing unit 33 from a supply pipe 37. Such finer limestone was added from the limestone supplying pipe 37 to keep the pH value approximately constant before and after change in the inlet $SO_2$ concentration. A change in the outlet $SO_2$ concentration is shown in FIG. 22. Similarly as in the case of Example 6, the outlet $SO_2$ concentration varies within a small range and recovers an initial set value thereof in a short period of time, even when the inlet $SO_2$ concentration changes.

Example 8.

Figure 23:
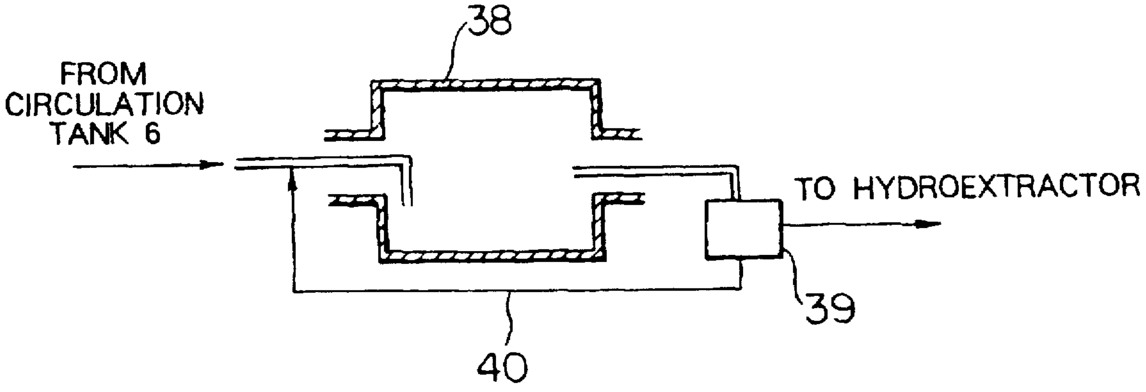
FIG. 23 is a schematic view of a wet process kiln used as a neutralizing device according to an eighth example of the present invention.

Instead of a tank provided with a stirrer 36 as shown in FIG. 20 and as used in Examples 6 and 7 as a neutralizing unit 33, a wet kiln 38 as shown in FIG. 23 is used in this example. In this example, it is possible to regulate residence time of the absorbing liquid in the kiln 38 by changing rotational speed of the kiln 38 itself instead of that of the stirrer 36 shown in FIG. 20, or by recycling a portion of the absorbing liquid to the inlet of the kiln 38 through a pipe line 40, which portion is diverted for recycle by means of a distributor 39 arranged at the outlet of kiln 38, instead of controlling level of the absorbing liquid (tank level) in the neutralizing unit 33 in FIG. 20.

Example 9.

Figure 24:
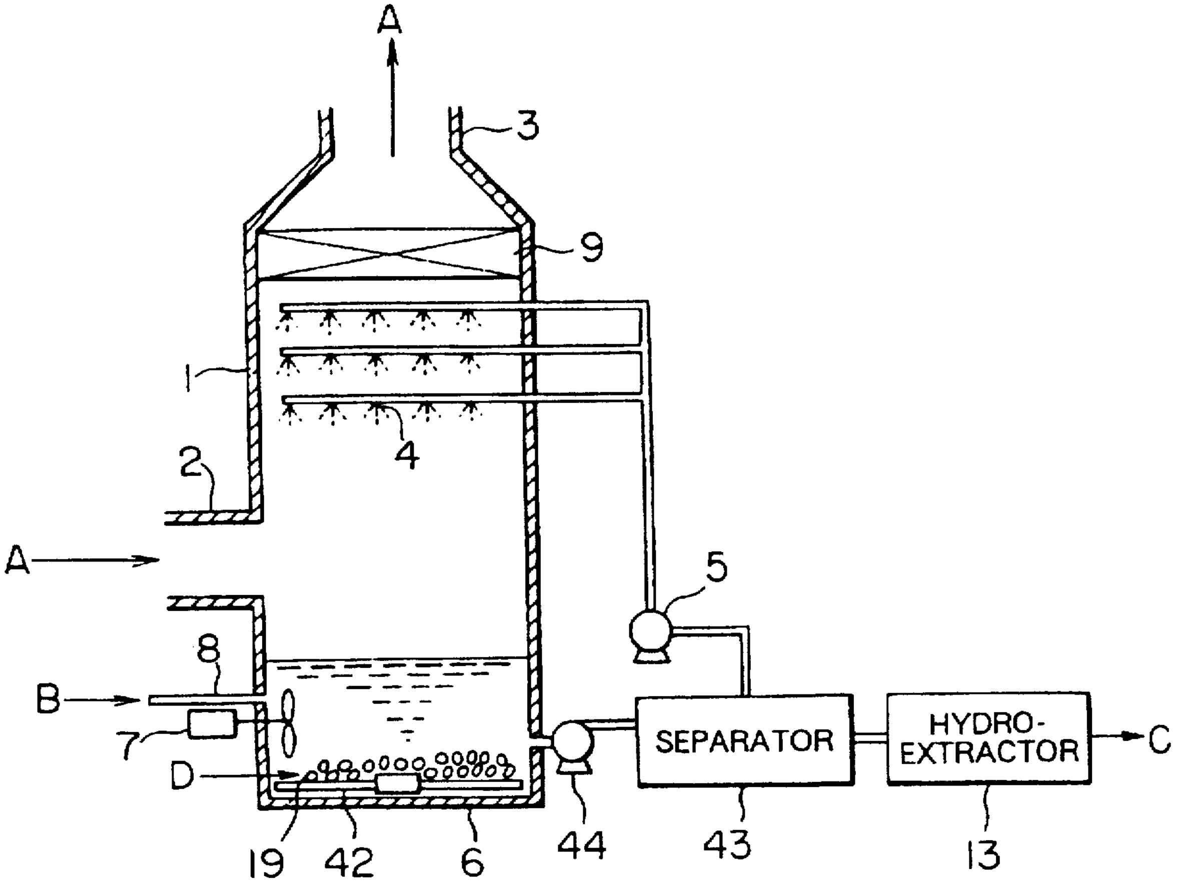
FIG. 24 is a schematic view of a rake arranged in the bottom of a neutralizing device according to a ninth example of the present invention.

While the neutralizing unit 33 is arranged outside of the desulfurization tower in Examples 5 to 8, it is also possible to mount a rake 42 in the bottom of circulation tank 6, to load particulate limestone D into the circulation tank 6 to form a limestone layer 19 and to control the $SO_2$ concentration of the desulfurization tower by changing rotational speed of the rake 42, as shown in FIG. 24. Equipment and components functioning similar to those used in Example 6 are referenced by the same numerals and further description thereof is omitted in this example.

A separator 43 is employed in this example. The absorbing liquid containing gypsum C drained from the circulation tank 6 is pumped to the separator 43 by means of a pump 44 to separate gypsum C. Then, the liquid containing little limestone D and predominantly gypsum C is fed to a hydroextractor 13 to dehydrate and collect gypsum C.

Although limestone D is selectively retained in the neutralizing zone by taking advantage of the differences in settling velocity due to the differences in particle diameters of limestone D and gypsum C, in all Examples described above, it is possible to separate limestone and gypsum by other methods, such as by means of a mesh or by taking advantage of the difference in inertial force. Further, although in all Examples a desulfurization tower has been described as including structure to introduce the exhaust gas from a bottom portion thereof and to exhaust it from an upper portion thereof, while the absorbing liquid is sprayed into the exhaust gas, the present invention is also effectively applicable to modifications by which flow direction of the exhaust gas into contact with the absorbing liquid is changed, such as a wetted wall absorbing unit or a bubbling system in which the exhaust gas is introduced into the absorbing liquid through a dip pipe and to a horizontal wet-type flue gas desulfurization plant in which flow of the exhaust gas is forcibly directed in a direction other than vertical.

Example 10.

Figure 25:
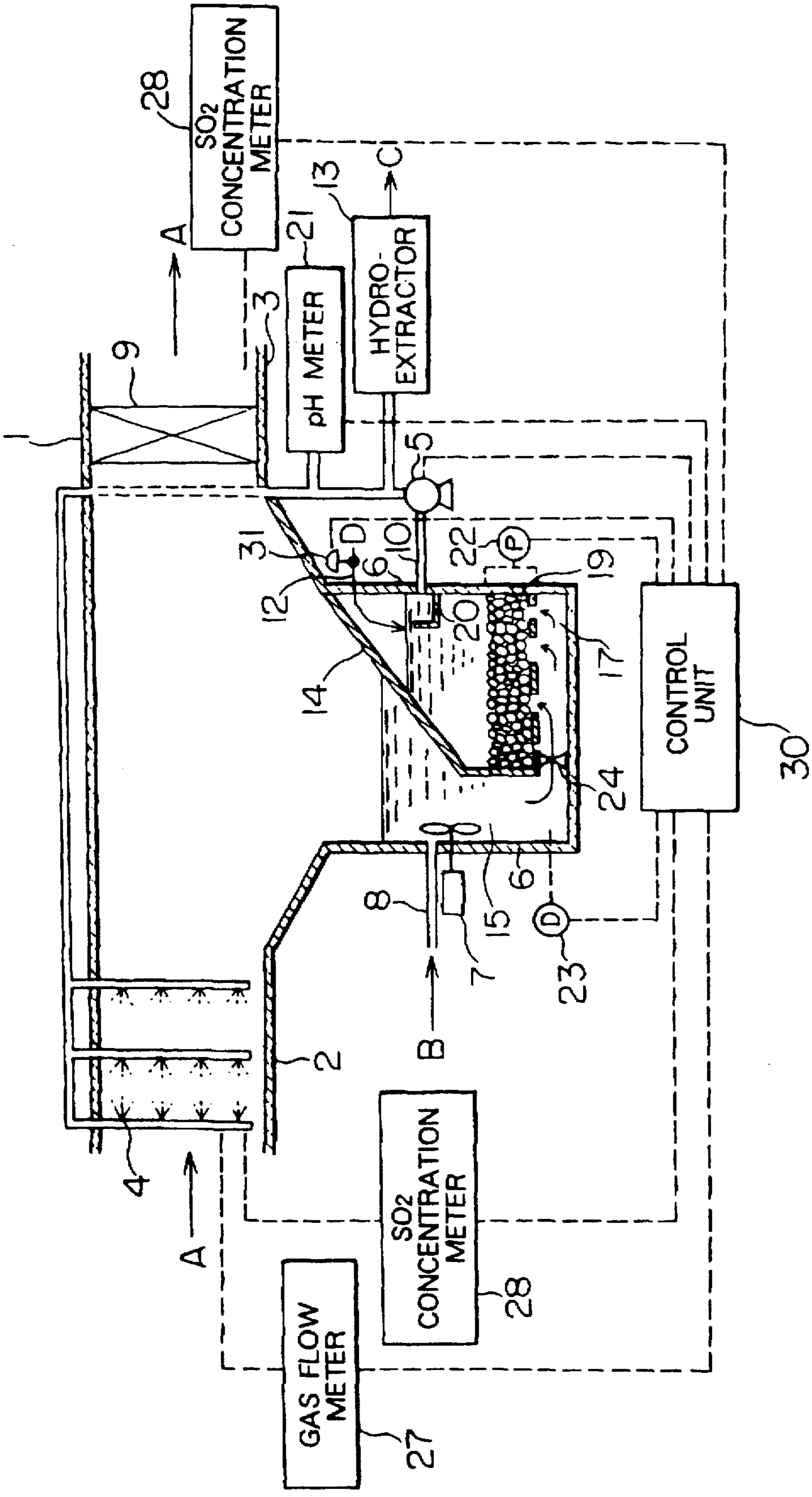
FIG. 25 is a schematic view of a horizontal (or crosswise) mono-tower wet-type flue gas desulfurization plant according to a tenth example of the present invention.

A horizontal wet-type flue gas desulfurization plant is used in this example. The present invention is effectively applicable to a horizontal (sideways) flue gas desulfurization plant in which the flow path of the exhaust gas is not vertical, as shown in FIG. 25. All equipment and components functioning similar to those used in the first Example are referenced by the same numerals and a further description thereof is omitted in this example. The desulfurization tower of the present example comprises a desulfurization tower body 1, an inlet duct 2 and an outlet duct 3. The inlet duct 2 is provided with spray nozzles 4 to spray the absorbing liquid into the exhaust gas introduced therein so as to absorb $SO_2$ into the liquid, which is then allowed to drop into a circulation tank 6 arranged in the lower portion of the desulfurization tower wherein it is subjected to oxidation. The outlet duct 3 is provided with a mist eliminator 9 to prevent sprayed mist from exiting the desulfurization tower.

The exhaust gas A exhausted from a boiler is introduced to the desulfurization tower 1 from the inlet duct 2 and exhausted from the outlet duct 3. At the same time, the absorbing liquid is sprayed in the desulfurization tower through plural spray nozzles 4 by means of pumps 5 for gas-liquid contact between the absorbing liquid and the exhaust gas. $SO_2$ in the exhaust gas A is thereby selectively absorbed in the absorbing liquid to form sulfurous acid. Droplets containing sulfurous acid thus formed drop onto a liquid collecting plate 14 arranged on the circulation tank 6. The absorbing liquid on the liquid collecting plate 14 is collected and introduced into a bottom portion of the circulation tank 6 through an introducing pipe 15. On the way, sulfurous acid is oxidized by oxidizing air B from an air blower 8 to form sulfuric acid. Plural dispersing pipes 17 for homogeneously dispersing the upward flow of the absorbing liquid branch from the bottom of the introducing pipe 15 through 15 a branch pipe 16, each dispersing pipe 17 having plural dispersing holes (not shown). The absorbing liquid and air are homogeneously and vigorously ejected through these dispersing holes to generate an upward flow. While gypsum is formed by a reaction between sulfuric acid and limestone in the fluidized limestone layer 19, only gypsum particles and water are drained out of the circulation tank 6 from an upper portion of the tank 6 and limestone is selectively retained therein, because the particle diameter of the gypsum particles is smaller than that of the limestone particles. The absorbing liquid neutralized in the limestone layer 19 is passed through absorbing liquid draining pipes 10 and pumped to the spray nozzles 4 by means of the absorbing liquid pumps 5. A portion of the absorbing liquid thus neutralized is pumped to a hydroextractor 13 to dehydrate and collect gypsum C. Instead of locating the limestone layer 19 in the absorbing liquid pool within the circulation tank 6 as shown in FIG. 25, a neutralizing unit can be arranged outside of the circulation tank 6 to contain particulate limestone therein.

The flow-chart of process control used in this example may be the same as that of Example 1 shown in FIG. 6. On the other hand, the flow-chart for process control shown in FIG. 14 may be used when the amount of limestone added is not to be controlled by inlet gas conditions (gas flow rate and the $SO_2$ concentration at the inlet and outlet of the desulfurization tower) and both the amount and particle diameter of the limestone are regulated on the basis of the height H of the limestone layer, as determined from pressure drop ($\Delta P$) across limestone layer 19 and specific gravity of the absorbing liquid.

Further, the desulfurization plant in the present example may be provided with an air or water blower 26 and air or water injection tubes 29 as shown in FIGS. 10 and 11 to promote agitation of the fluidized limestone D in the limestone layer 19. In this case, it is possible to regulate agitating rate of the limestone layer 19 caused by air or water in the neutralizing zone by varying the amount of air or water supplied to the neutralizing zone, instead of regulating particle diameter of limestone D. A flow-chart for process control in this latter case is the same as FIG. 12.

Absorbing towers which may be utilized in the present invention include those in which the gas flow through the absorbing tower is directed horizontally as shown in FIG. 25, as well as those in which the gas flow path is slightly inclined away from the vertical direction.

Figure 26:
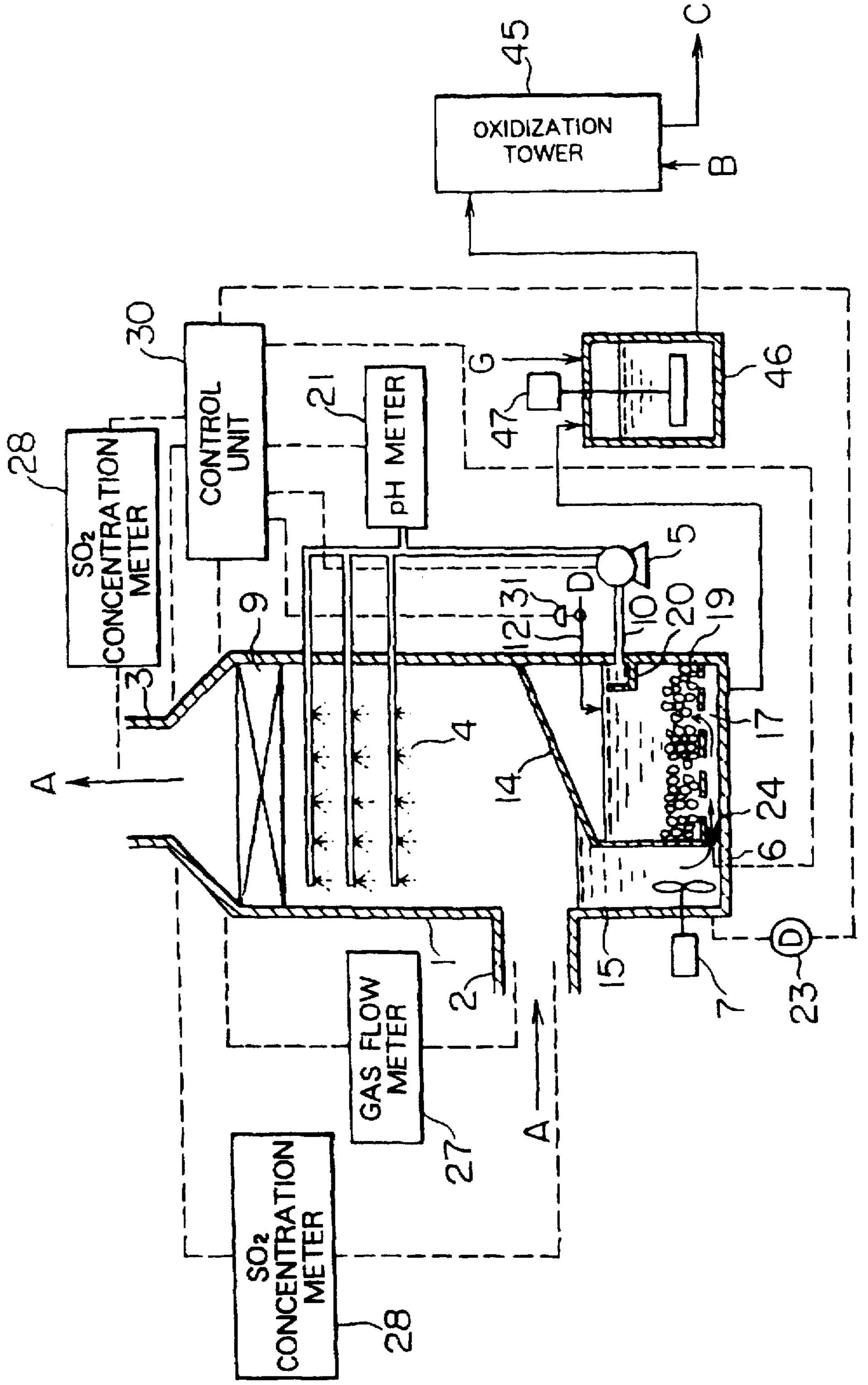
FIG. 26 is a schematic view of mono-tower wet-type flue gas desulfurization plant provided with an external oxidization tower according to an eleventh example of the present invention.

Example 11:

A flue gas desulfurization plant provided with an external oxidization tower as shown in FIG. 26 is used in this example. This present desulfurization plant comprises three towers, i.e., a cooling tower for conducting cooling and dust-removal for the exhaust gas (not shown), a desulfurization tower body 1 for spraying the absorbing liquid to react with $SO_2$ in the exhaust gas and an oxidation tower 45 for oxidizing calcium sulfite formed in the desulfurization tower body 1. The principal reactions occurring in the flue gas desulfurization plant provided with the external oxidation tower shown in FIG. 26 are as follows.

$SO_2$ in the exhaust gas A is absorbed by the absorbing liquid (main constituent: water) in the desulfurization tower body 1 to form $H_2SO3$, which is then reacted with calcium sulfite ($CaSO_3 \frac{1}{2}H_2O$) contained in the absorbing liquid to form calcium hyposulfite ($Ca(HSC_3)_2$). Calcium hyposulfite is reacted with limestone in a neutralizing zone during passage through a limestone layer 19 to form calcium sulfite. Calcium sulfite thus formed is recycled to spray nozzles 4 and reacted with $H_2SO_3$ which has been formed by absorption of $SO_2$ in the exhaust gas A. On the other hand, a part of the calcium sulfite is fed to a tank 46, where the pH thereof is regulated by adding sulfuric acid G with agitation by means of a stirring device 47, and then fed to the oxidization tower 45. Air is supplied to the oxidation tower 45, whereby calcium sulfite is oxidized to form gypsum ($CaSO_4 2H_2O$). The foregoing is summarized by the following chemical reaction formulas:

(Absorbing Reaction) $H_2O+SO_2=H_2SO_3CaSO_3\ \frac{1}{2}H_2O+H_2SO_3=Ca(HSO_3)_2+\frac{1}{2}H_2O$ (Neutralizing Reaction) $Ca(HSO_3)_2+CaCO_3=CaSO_3-\frac{1}{2}H_2O+CO_2$ (Oxidization Reaction) $CaSO_3-\frac{1}{2}H_2O+\frac{1}{2}O_2+\frac{3}{2}H_2O=CaSO_4 2H_2O$ The flowchart for process control of the desulfurization tower according to this example is the same as that of the first example. This example may also employ control following the flowchart as illustrated in FIG. 14, that as illustrated in FIGS. 10 and 11 using the air or water blower 26 or that as illustrated in FIG. 12 using the air or water blower tubes 29 for agitating the limestone layer 19.

As described above, according to the present invention, it is possible to obtain a stable desulfurizing performance which is not reduced even if the amount of the absorbing liquid circulated is varied. Moreover, since it employs solid desulfurizing agents which are not subjected to particle size reduction, it can dispense with the cost of the particle size reduction for economically obtaining a high desulfurizing performance and for easily controlling the $SO_2$ concentration in the exhaust gas at the desulfurization tower outlet against a variation in the load of a boiler or the sulfur content of fuel, so that the desulfurization plant can be stably operated with less variance in desulfurizing performance.

What is claimed is:

1. A wet flue gas desulfurization method for removing sulfur oxides from an exhaust gas of a combustion apparatus burning fuel having a sulfur content, said method comprising:

contacting the exhaust gas with a water-containing absorbent liquid in an absorbing zone to absorb the sulfur oxides thereby forming an acidic water-containing liquid;

collecting the acidic water-containing liquid in a pool below said absorbing zone;

passing the collected acidic water-containing liquid through a bed of particles of a solid desulfurizing agent contained within a neutralization zone, for neutralization of the acidic water-containing liquid by reaction with the desulfurizing agent particles to form solid reaction product particles in an admixture with the water-containing absorbent liquid and a treated exhaust gas with a reduced sulfur oxide content;

adding desulfurizing agent particles to the bed of solid desulfurizing agent to replace said desulfurizing agent particles consumed by said neutralization reaction;

physically separating by size the admixture of water-containing absorbent liquid and the solid reaction product particles from the desulfurizing agent particles, said desulfurizing agent particles having a particle size sufficiently larger than the reaction product particles to allow physical separation of the two types of particles;

detecting at least one operating parameter selected from the group consisting of pressure drop across the neutralizing zone, solids concentration in the water-containing absorbent liquid, specific gravity of the water-containing absorbent liquid and viscosity of the water-containing absorbent liquid;

controlling the sulfur oxide content in the treated exhaust gas, responsive to said detected operating parameters, by regulating at least one control variable selected from the group consisting of the rate of addition of desulfurizing agent particles to the bed, particle diameter of the solid desulfurizing agent particles added to the bed and flow rate of the water-containing absorbent liquid to the absorbing zone; and recirculating at least one portion of the separated admixture to the absorbing zone for use in said contacting step while leaving said desulfurizing agent particles within the neutralization zone.

2. A wet flue gas desulfurization method according to claim 1 further comprising:

agitating the bed with a rotary stirring device; detecting torque of the stirring device, and regulating rotational speed of the stirring device responsive to the detected torque.

3. A wet-type flue gas desulfurization method according to claim 2 wherein the bed of desulfurizing agent particles is fluidized by passage of the acidic water-containing liquid therethrough and wherein the sulfur oxide content in the treated exhaust gas is further controlled by regulating the flow rate of the acidic water-containing liquid through the bed of solid desulfurizing agent.

4. A wet flue gas desulfurization method according to claim 1 further comprising:

introducing a fluid into the bed of solid desulfurizing agent, independently of the flow of the acidic water-containing liquid, for fluidizing the bed of solid desulfurizing agent, and wherein the sulfur oxide content in the treated exhaust gas is further controlled by regulation of the flow rate of the fluid through the bed of solid desulfurizing agent.

5. A wet flue gas desulfurization method according to claim 4 wherein said bed is subdivided into a plurality of divisions and wherein each division is independently fluidized.

6. A wet flue gas desulfurization method according to claim 3 wherein said bed is subdivided into a plurality of divisions and wherein each division is independently fluidized.

7. A wet flue gas desulfurization method according to claim 1 wherein the solid desulfurizing agent is limestone and wherein the solid reaction product is gypsum.

8. A wet flue gas desulfurization method according to claim 1 wherein the solid desulfurizing agent in the neutralization zone has an average particle diameter of at least 0.5 mm.

9. A wet flue gas desulfurization method according to claim 6 further comprising:

detecting pH of the water-containing absorbent liquid;

detecting $SO_2$ concentration in the exhaust gas;

calculating a required ratio of flow rate of water-containing absorbent liquid to detected flow rate of the exhaust gas (L/G) in accordance with the detected $SO_2$ concentration in the exhaust gas, the detected pH and a relationship between L/G and $SO_2$ concentration in the exhaust gas predetermined for the detected pH; and wherein the flow rate of the acidic water-containing liquid through the bed of solid desulfurizing agent is regulated by changing the number of said divisions through which said acidic water-containing liquid is passed.

10. A wet flue gas desulfurization method according to claim 9 wherein said at least one operating parameter comprises:

specific gravity of the water-containing absorbent liquid; and pressure drop across the bed;

regulating the particle size of the solid desulfurizing agent added to the bed responsive to the detected specific gravity and the detected pressure drop.

11. A wet flue gas desulfurization method according to claim 1 wherein said at least one operating parameter comprises:

specific gravity of the water-containing absorbent liquid; said pressure drop across the bed;

regulating the particle size of the solid desulfurizing agent added to the bed responsive to the detected specific gravity and the detected pressure drop.

12. A wet flue gas desulfurization method according to claim 1 wherein one of said parameters detected is the viscosity of the water-containing absorbent liquid.

13. A wet flue gas desulfurization method according to claim 1 wherein one of said parameters detected is pressure drop across the neutralizing zone.

14. A flue gas desulfurization apparatus for removing sulfur oxides from an exhaust gas of a combustion apparatus burning fuel having a sulfur content, said apparatus comprising:

a housing defining an absorbing zone and containing means for contacting the exhaust gas with a water-containing absorbent liquid in the absorbing zone to absorb the sulfur oxides from the exhaust gas thereby forming an acidic water-containing liquid;

a tank for collecting the acidic water-containing liquid in a pool;

a bed of a particulate, solid desulfurizing agent defining a neutralization zone for neutralization of the acidic water-containing liquid by contact with the solid desulfurizing agent to form solid reaction product particles in an admixture with the water-containing absorbent liquid and a treated exhaust gas with a reduced sulfur oxide content;

a desulfurizing agent particle feeder for adding solid desulfurizing agent to the bed to replace that consumed by said neutralization reaction;

separation means for separating by size the admixture of the water-containing absorbent liquid and solid reaction product particles from the desulfurizing agent particles, said desulfurizing agent particles having a particle size sufficiently larger than the reaction product particles to allow physical separation of the two types of particles;

detection means for detecting at least one process parameter selected from the group consisting of pressure drop across the neutralizing zone, solids concentration in the water-containing absorbent liquid, specific gravity of the water-containing absorbent liquid and viscosity of the water-containing absorbent liquid;

control means, for controlling the sulfur oxide content in the treated exhaust gas, responsive to the detected process parameters, by regulation of at least one control variable selected from the group consisting of the rate of addition of desulfurizing agent particles to the bed, particle diameter of the solid desulfurizing agent particles added to the bed and flow rate of the water-containing absorbent liquid to the absorbing zone; and means defining a recirculation loop for recirculating at least one portion of the separated admixture to the absorbing zone while leaving the separated desulfurizing agent particles within the neutralization zone.

15. The flue gas desulfurization apparatus of claim 14 further comprising a rotary stirring device for agitating the bed of solid desulfurizing agent, means for detecting torque of said rotary stirring device and means for controlling rotational speed of said rotary stirring device responsive to the detected torque.

16. A flue gas desulfurization apparatus according to claim 14 wherein said neutralization zone is contained within said tank and wherein said tank and said housing are integrated into a single vertical tower structure.

17. A flue gas desulfurization apparatus according to claim 14 wherein said solid desulfurizing agent has a weight-average particle diameter of at least 0.5 mm.

18. A flue gas desulfurization apparatus according to claim 14 wherein said solid desulfurizing agent is limestone.

19. A flue gas desulfurization apparatus according to claim 17 wherein said solid desulfurizing agent is limestone.

20. A flue gas desulfurization apparatus according to claim 14 further comprising:

partitions dividing the bed into a plurality of divisions;

means for independently fluidizing solid desulfurizing agent in each of said divisions; and a pH sensor for detecting pH of the water-containing absorbent liquid;

means for detecting $SO_2$ concentration in the exhaust gas;

calculating means for calculating a required ratio of flow rate of water-containing absorbent liquid to detected flow rate of the exhaust gas (L/G) in accordance with the detected $SO_2$ concentration in the exhaust gas, the detected pH and a relationship between L/G and $SO_2$ concentration in the exhaust gas predetermined for the detected pH; and means for changing the number of said divisions through which said acidic water-containing liquid is passed, in accordance with the calculated ratio L/G.

21. A wet flue gas desulfurization apparatus according to claim 20 wherein said detection means comprises:

means for detecting specific gravity of the water-containing absorbent liquid;

means for detecting pressure drop across the bed; and means for regulating the particle size of the solid desulfurizing agent added to the bed responsive to the detected specific gravity and the detected pressure drop.

22. A wet flue gas desulfurization apparatus according to claim 14 wherein said detection means comprises:

means for detecting specific gravity of the water-containing absorbent liquid;

means for detecting pressure drop across the bed; and means for regulating the particle size of the solid desulfurizing agent added to the bed responsive to the detected specific gravity and the detected pressure drop.

* * * * *

UNITED STATES PATENT AND TRADEMARK OFFICE
CERTIFICATE OF CORRECTION

PATENT NO. : 5,788,944

DATED : August 4, 1998

INVENTOR(S) : KIKKAWA et al

It is certified that error appears in the above-indentified patent and that said Letters Patent is hereby corrected as shown below:

On the title page, item [75]:

Under the heading "Inventors", "all of Kure" should read --all of Hiroshima--.

Under the heading "Foreign Patent Documents", "63-298429" should read --62-298429--.

Col. 11, line 59, "90°%" should read --90%--.

Col. 15, line 53, "SO3" should read --$SO_3$--; and
line 55, "($Ca(HSC_3)_2$)" should read --($Ca(HSO_3)_2$)--.

Col. 16, line 1, "½$H_2O$" should read --·½$H_2O$--.

Signed and Sealed this

Seventh Day of September, 1999

Attest:

Q. TODD DICKINSON

*Attesting Officer*

*Acting Commissioner of Patents and Trademarks*